Feb. 25, 1958 M. L. ERNST 2,825,054
DYNAMIC AUTOMATIC TRAFFIC ANALYZER CONTROLLER
Filed Sept. 15, 1953 11 Sheets-Sheet 1
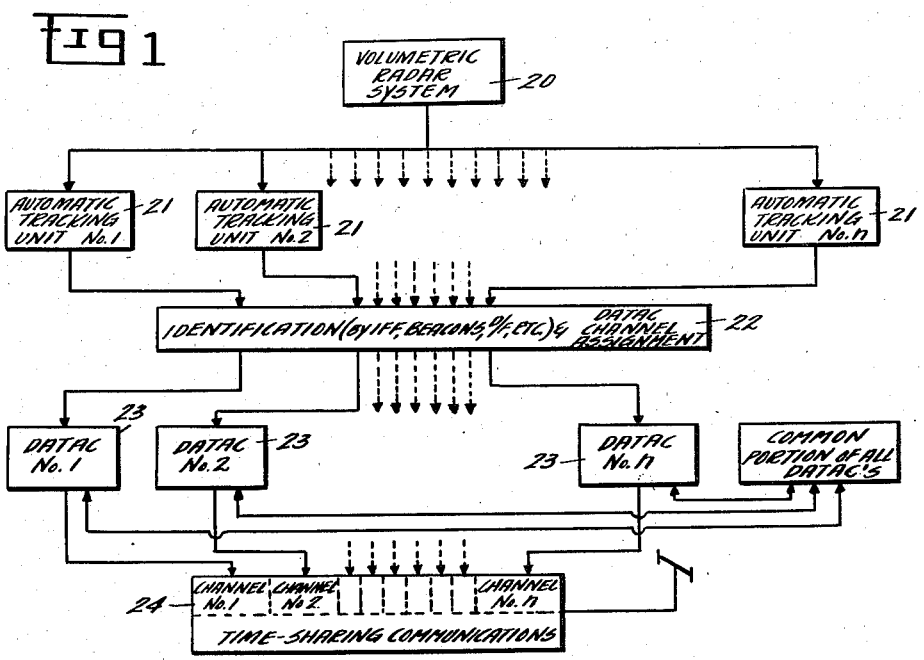
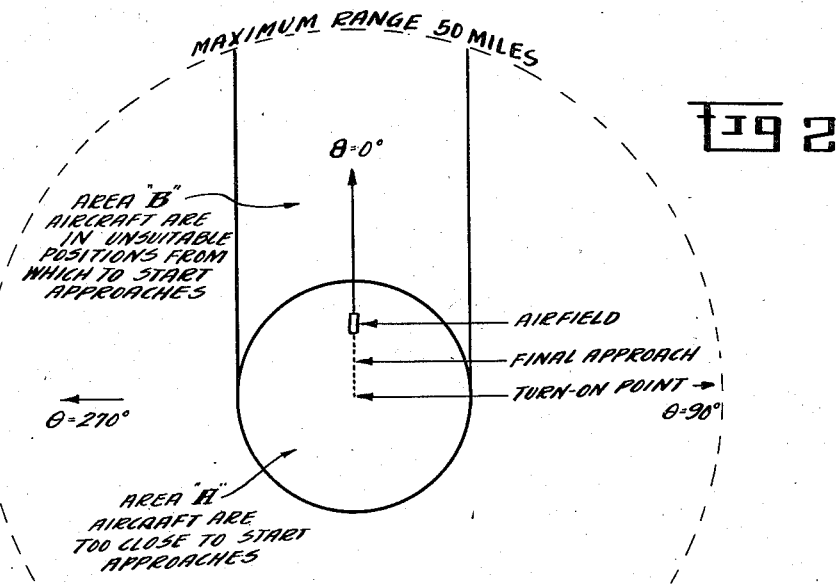
INVENTOR.
MARTIN L. ERNST Feb. 25, 1958 M. L. ERNST 2,825,054
DYNAMIC AUTOMATIC TRAFFIC ANALYZER CONTROLLER
Filed Sept. 15, 1953 11 Sheets-Sheet 2
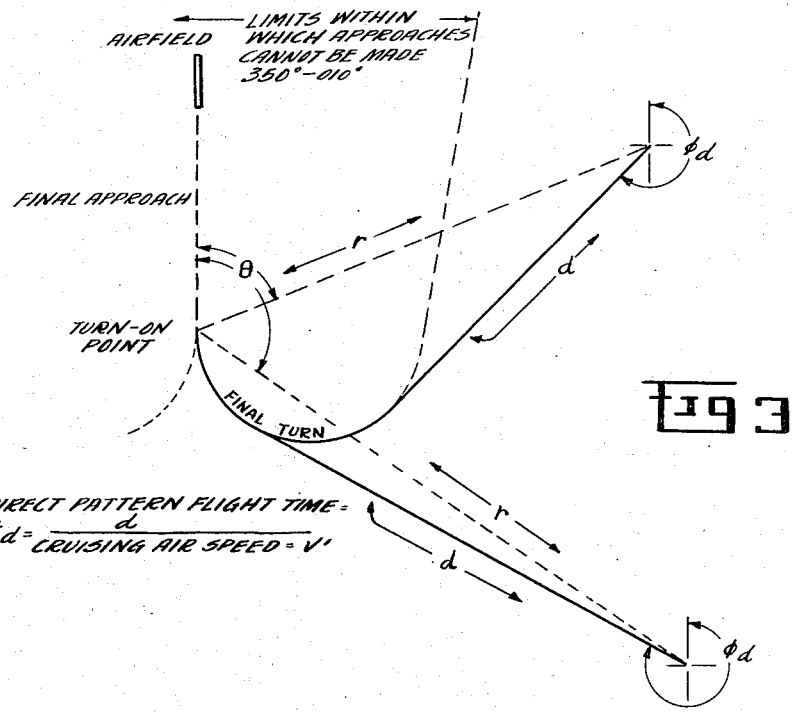
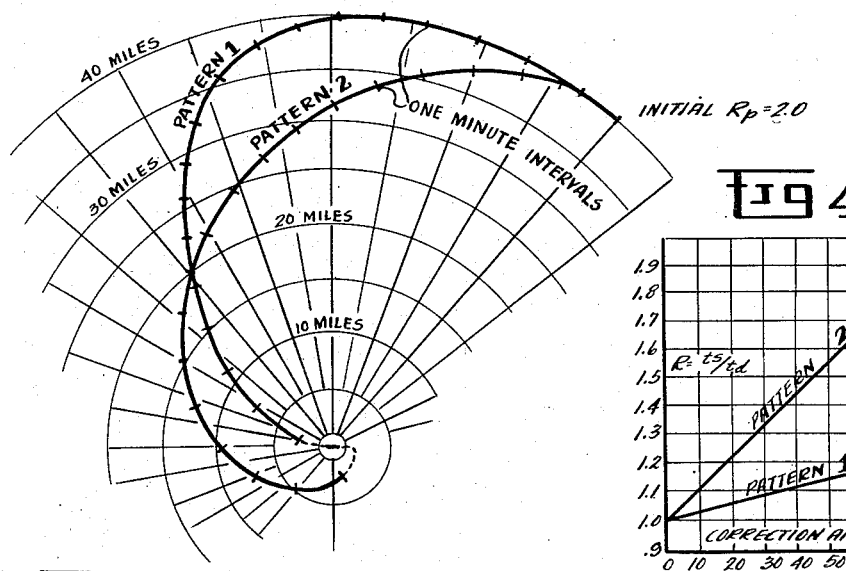
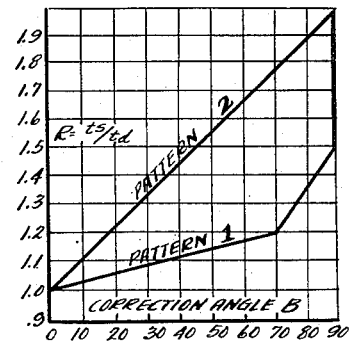
INVENTOR.
MARTIN L. ERNST Feb. 25, 1958 M. L. ERNST 2,825,054
DYNAMIC AUTOMATIC TRAFFIC ANALYZER CONTROLLER
Filed Sept. 15, 1953 11 Sheets-Sheet 3
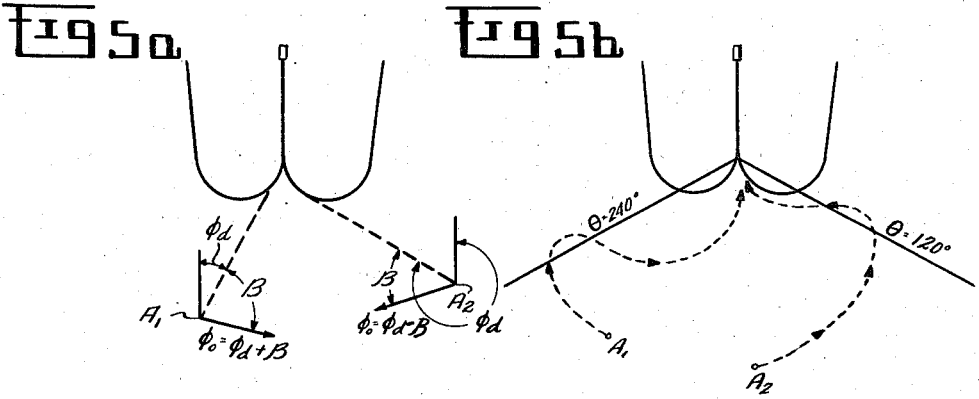
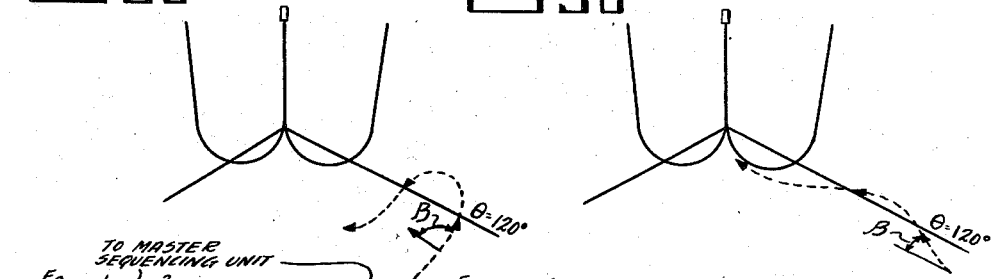
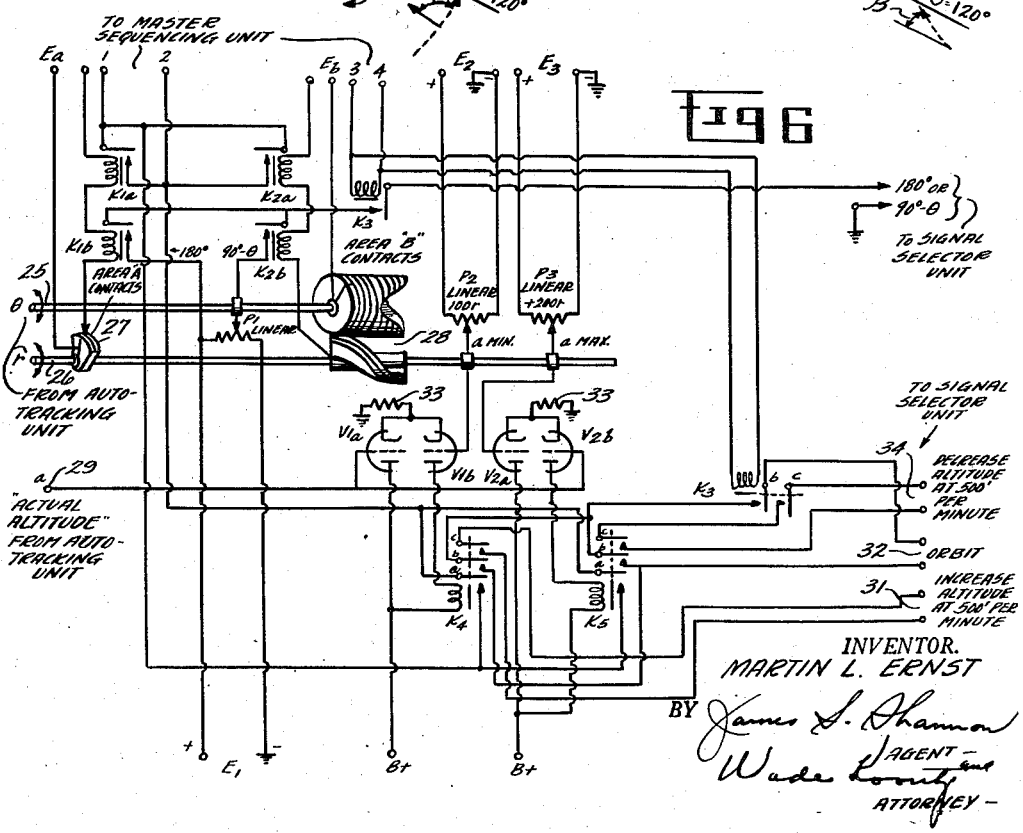
INVENTOR.
MARTIN L. ERNST

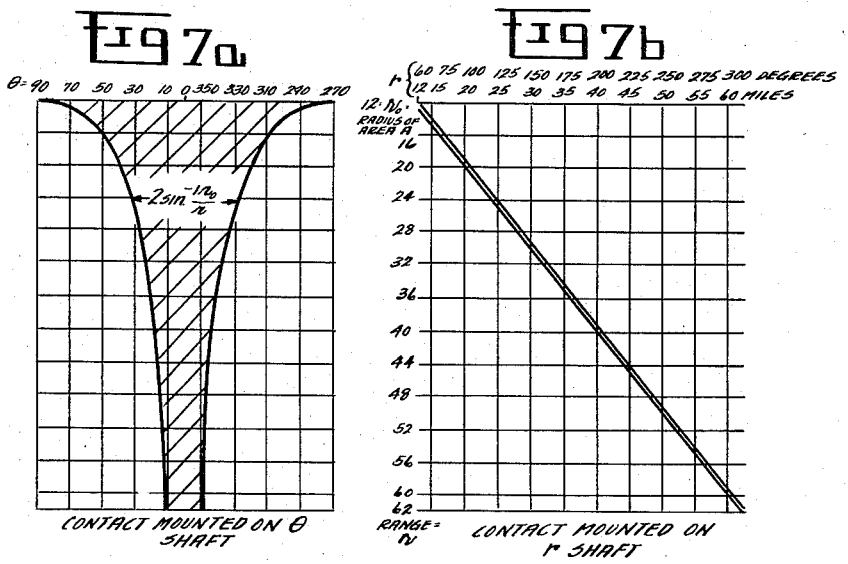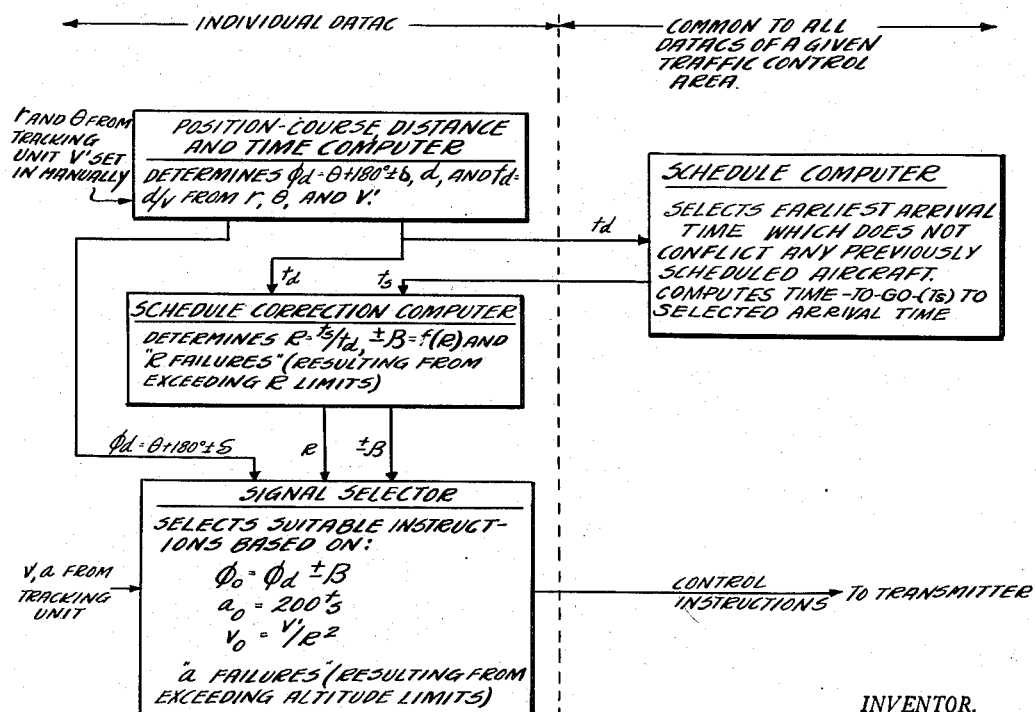

Feb. 25, 1958
M. L. ERNST
2,825,054
DYNAMIC AUTOMATIC TRAFFIC ANALYZER CONTROLLER
Filed Sept. 15, 1953
11 Sheets-Sheet 5
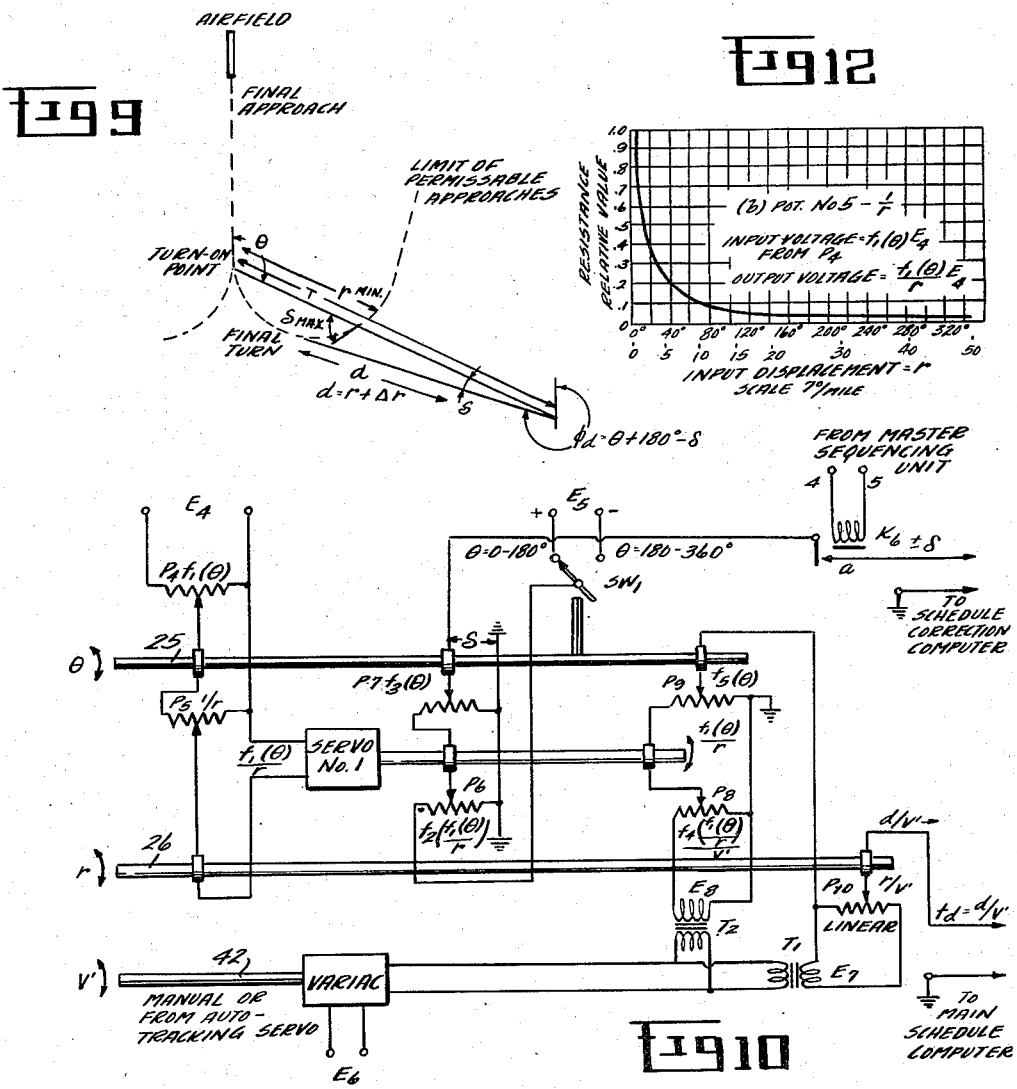
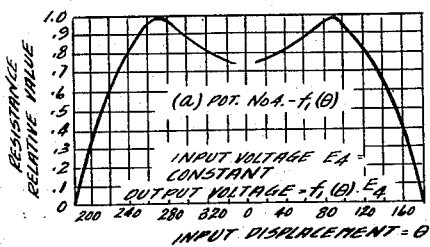
INVENTOR.
MARTIN L. ERNST

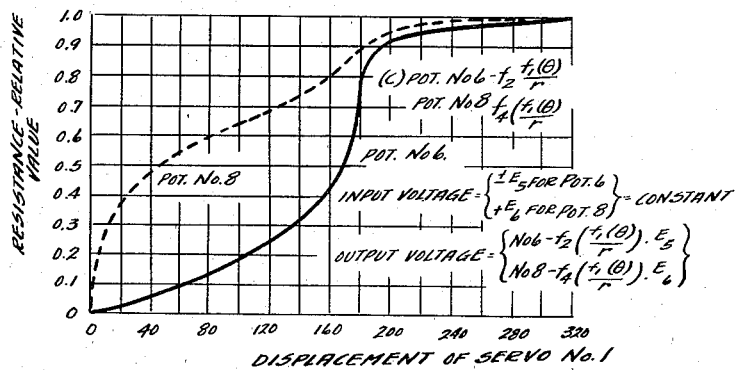
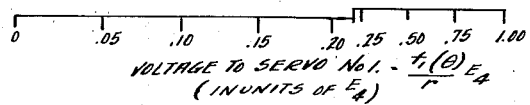
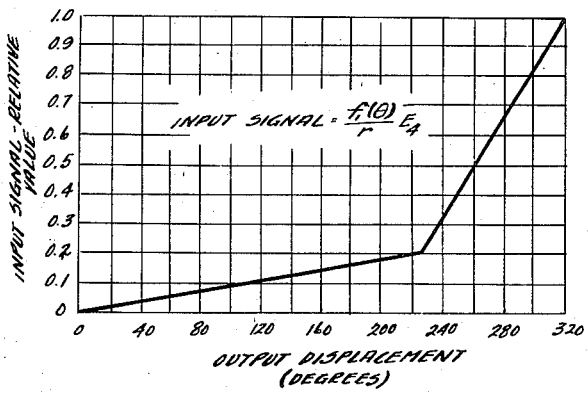
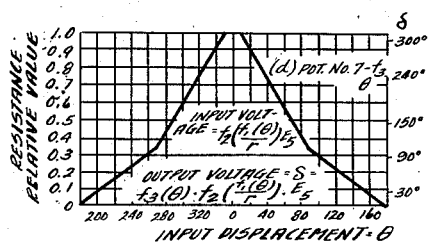
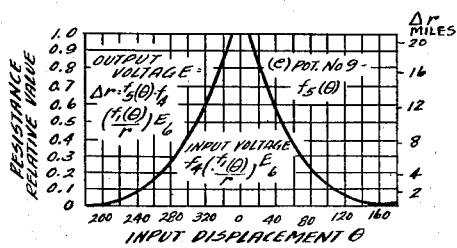

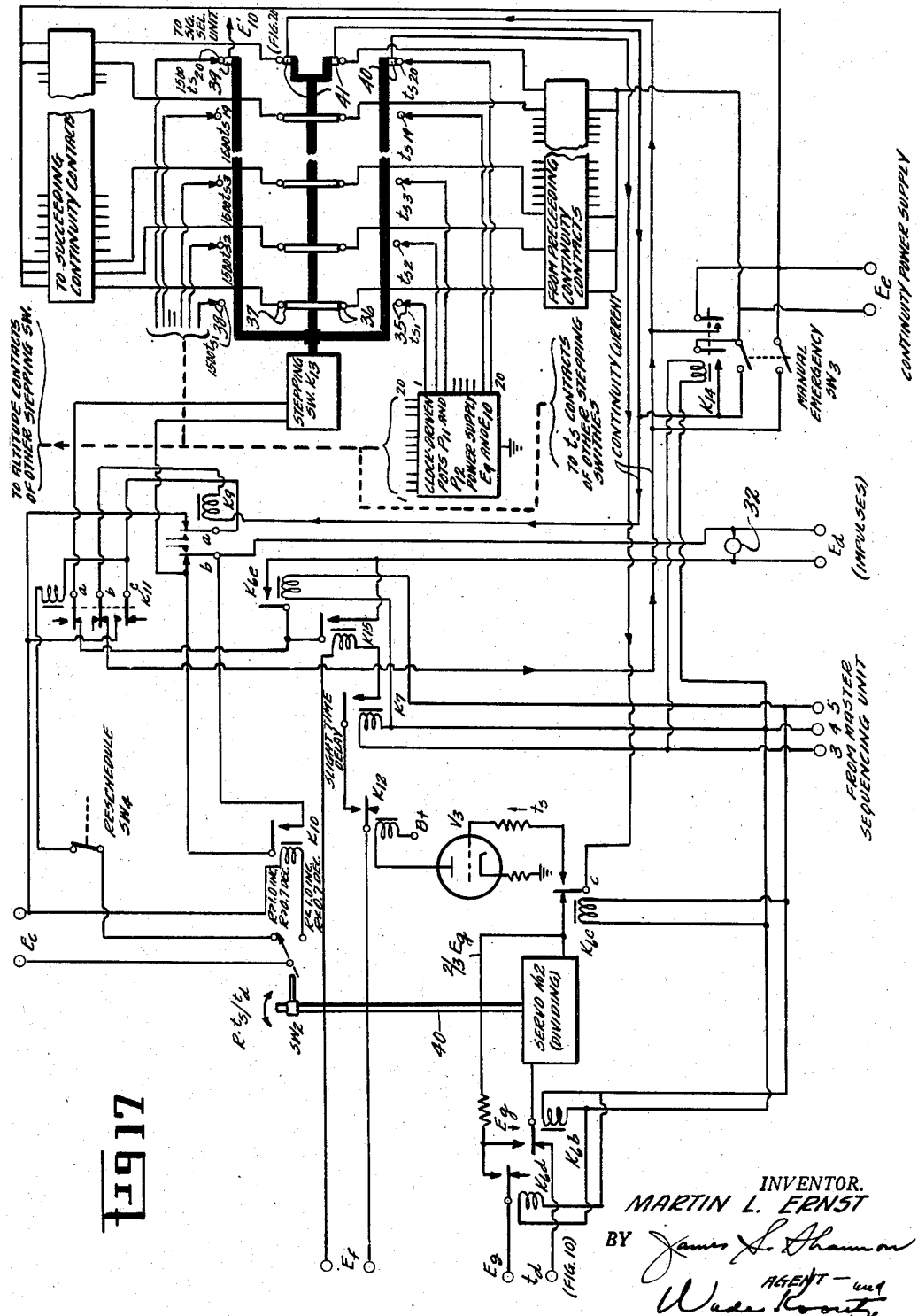

Feb. 25, 1958 M. L. ERNST 2,825,054
DYNAMIC AUTOMATIC TRAFFIC ANALYZER CONTROLLER
Filed Sept. 15, 1953 11 Sheets-Sheet 8

INVENTOR.
MARTIN L. ERNST
BY

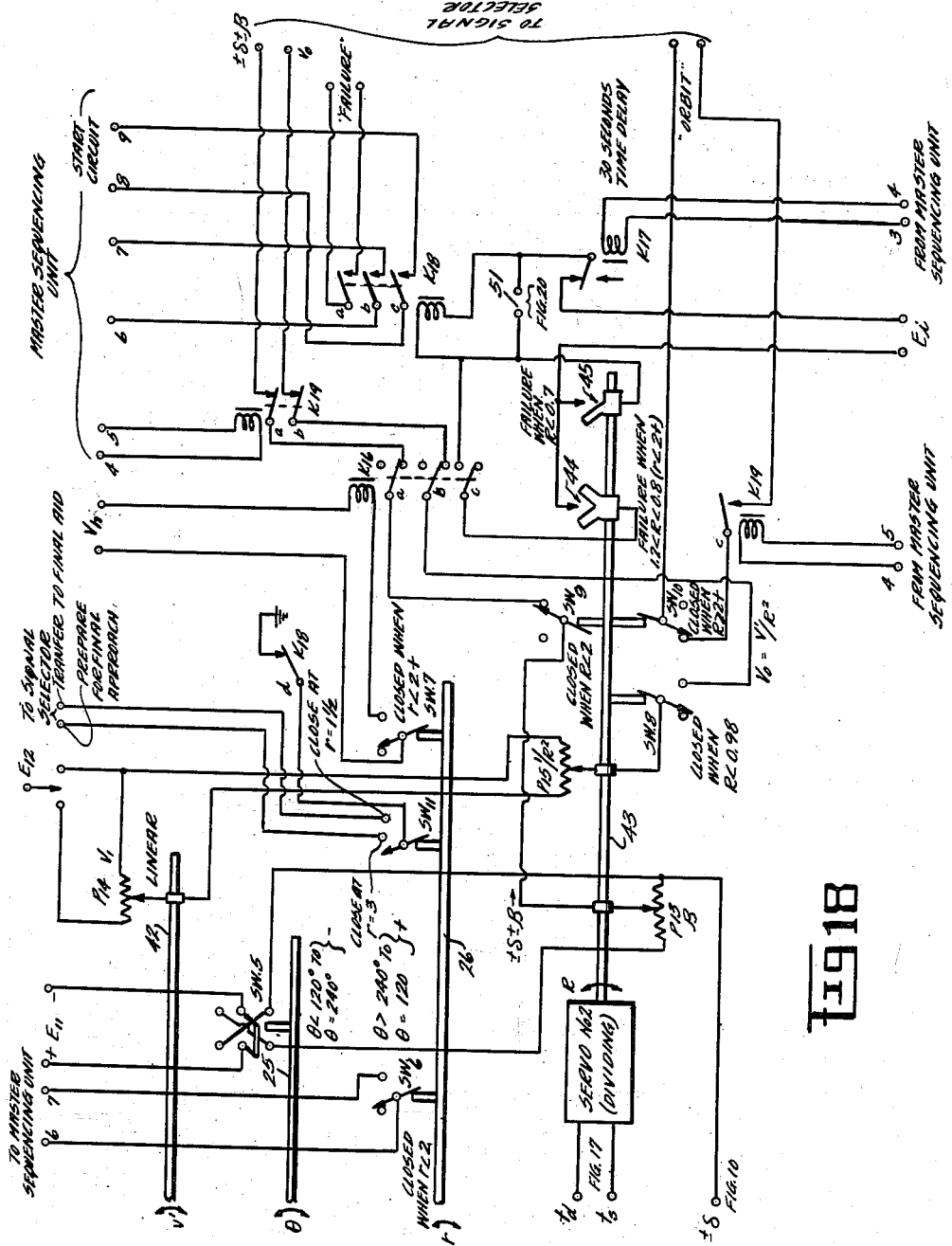

Feb. 25, 1958   M. L. ERNST   2,825,054
DYNAMIC AUTOMATIC TRAFFIC ANALYZER CONTROLLER
Filed Sept. 15, 1953   11 Sheets-Sheet 10
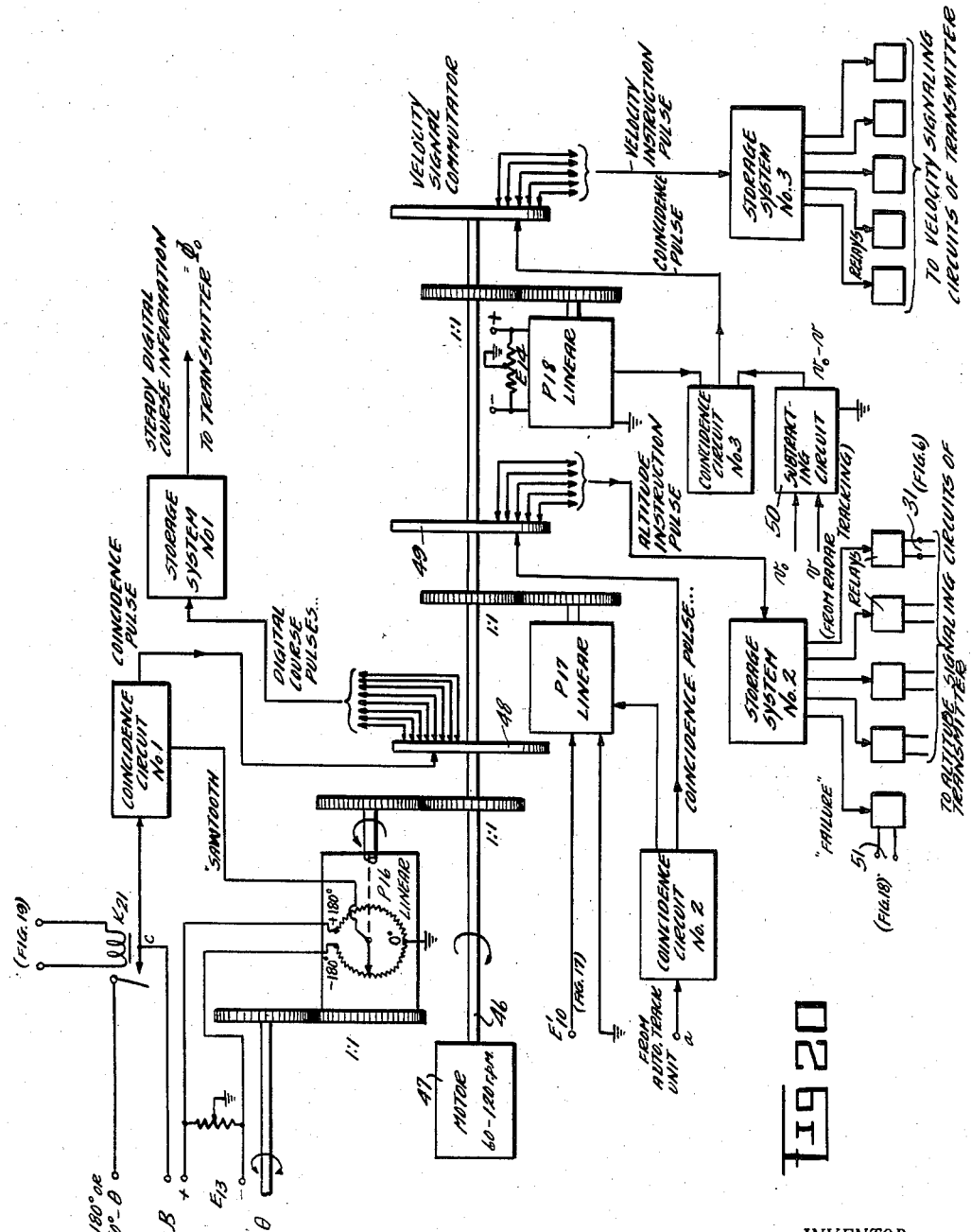
INVENTOR.
MARTIN L. ERNST

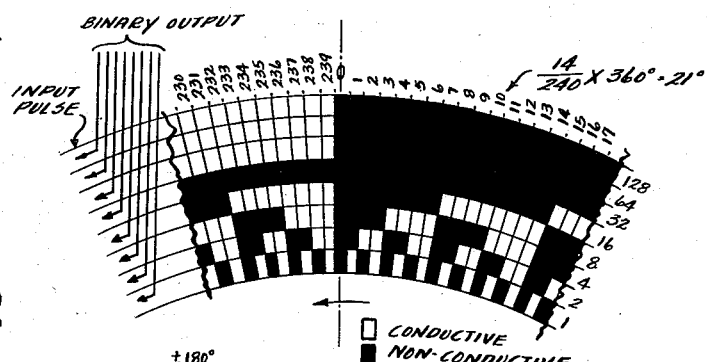
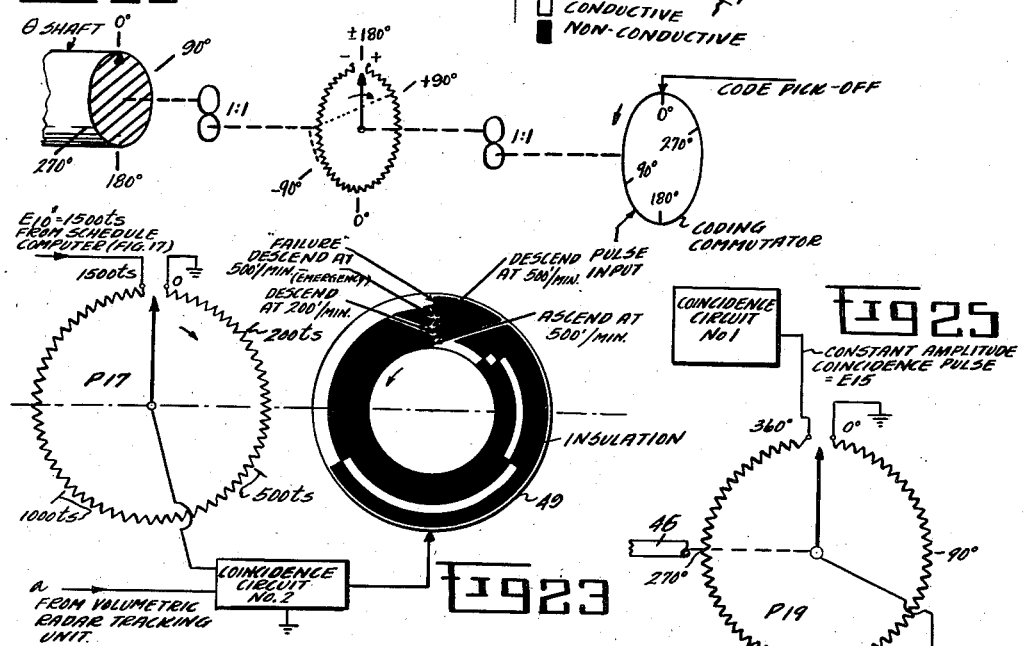
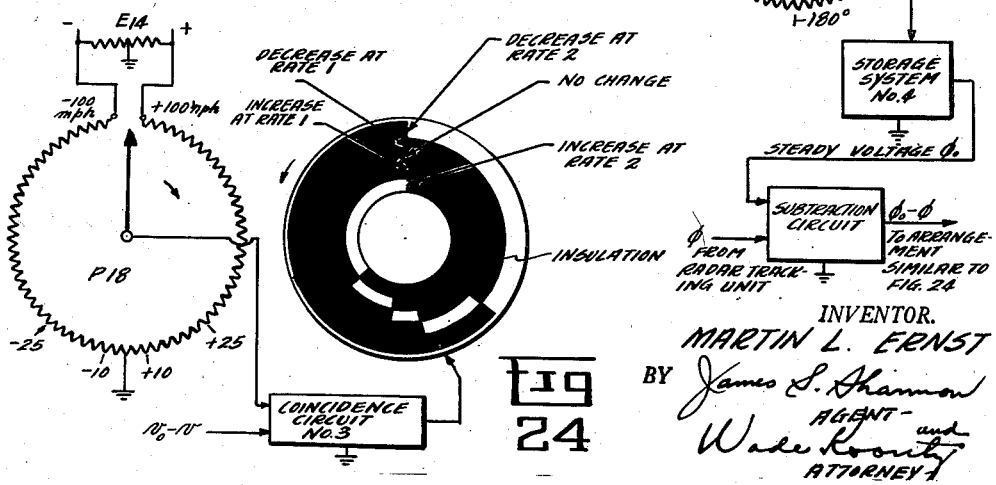

United States Patent Office 2,825,054
Patented Feb. 25, 1958

2,825,054

DYNAMIC AUTOMATIC TRAFFIC ANALYZER CONTROLLER

Martin L. Ernst, Washington, D. C.

Application September 15, 1953, Serial No. 380,382

18 Claims. (Cl. 343—6)

(Granted under Title 35, U. S. Code (1952), sec. 266)

The invention described herein may be manufactured and used by or for the Government for governmental purposes without payment to me of any royalty thereon.

This invention relates to air traffic control. Such control may be divided into three phases:

(1) The collection of data and other pertinent information, including the positions, velocities, courses, etc., on all aircraft in the region under control.

(2) The assimilation of this data and its use in determining the procedures to be followed.

(3) The transmission of information to aircraft and its presentation therein so that they may carry out the adopted procedures.

This invention relates to the second of the above phases. The first phase may be accomplished by a volumetric radar system, while the third phase may be carried out with any suitable radio transmission means capable of handling the amount of information required, and by any suitable presentation apparatus in the aircraft.

Two types of automatic traffic control procedures which have been proposed in the past are generally termed the "fixed-block" and the "moving-block" systems. Both of these methods suffer from a number of inherent faults, based mainly upon their inflexibility, some of which are (1) they require either fixed points of entry to and exit from the control area, the use of human control over portions of the tracks, or the development of automatic computers to feed aircraft into the proper blocks; (2) they require traffic patterns of extreme complexity or they will be unable to cope with all the situations likely to be encountered; (3) they require continuous and very critical spacing control by each aircraft, and since a fixed path in space is employed, spacing control is forced to rely on the least efficient control parameter . . . air speed; (4) the systems are extremely sensitive to the presence of uncontrolled aircraft; and (5) the systems do not immediately lend themselves to the most usable form of instrumentation, as the primary data consists of positional error rather than corrective-action information.

The weaknesses of the block systems are fundamentally determined by their adoption of rigid paths in both space and time. It is the object of this invention to provide a computer for a more flexible traffic control system based on the availability of a choice of paths in the four-dimensional continuum. This choice permits selection, after consideration of all relevant factors, of the optimum approach path for each aircraft under control. In addition this inherent flexibility makes possible a procedure for continuously making efficient corrections for the small unavoidable errors which are always present in flight. Further objects of the invention are to provide a computer giving coverage over the entire control area and providing traffic solutions in the form of corrective instructions. Finally, it is also the object of the invention to provide a traffic computer having excellent characteristics for military use, such as: a minimum amount of airborne equipment, the ability to provide the swiftest possible approach paths for emergency aircraft, the ability to operate effectively in bases remote from any other traffic control system, and the provision of a minimum amount of information to any listening enemy.

The fundamental manner in which the described Dynamic Automatic Traffic Analyzer-Controller, hereinafter referred to as DATAC, differs from other proposed traffic control procedures lies in the use of dynamic, rather than fixed, approach paths. The importance of this feature is derived from the fact that it enables the aircraft to make use of their easiest and most natural methods of maneuver. In effect, the traffic control system is designed to fit the characteristics of aircraft in flight. To the greatest degree possible all DATAC actions are comparable to those which would be taken by a pilot operating under ideal conditions.

The DATAC, of which there will be one for each aircraft under control, consists of three parts, namely: a First Sequence Unit, a Second Sequence Unit and a Master Sequencing Unit. The construction and function of these various parts will be explained in connection with the accompanying drawings in which:

Fig. 1 shows in block form a complete DATAC air traffic control system;

Fig. 2 shows the possible starting positions for aircraft brought under DATAC control;

Fig. 3 shows the direct pattern flight characteristics;

Figure 17A:
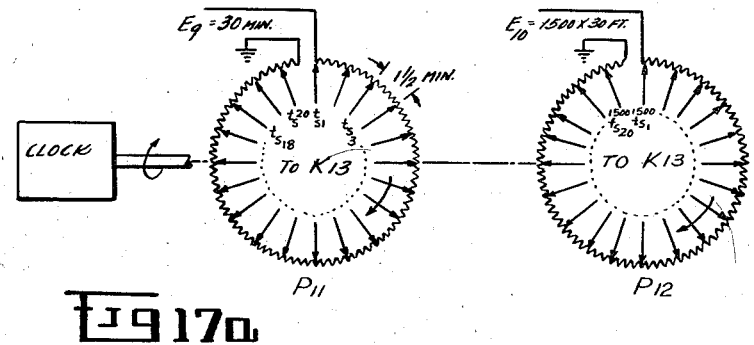

Figs. 4ab show typical approach patterns;

Figs. 5abcd illustrate offset angle and switch operations;

Fig. 6 shows the First Sequence Unit;

Figs. 7ab show the construction of Area "B" contacts in the First Sequence Unit;

Fig. 8 shows a block diagram of the Second Sequence Unit;

Fig. 9 illustrates the relationships used in the Position-Course, Distance and Time Computer;

Fig. 10 is a schematic diagram of the Position-Course, Distance and Time Computer;

Figs. 11, 12, 14, 15 and 16 show potentiometer characteristics in the Position-Course, Distance and Time Computer;

Fig. 13 shows the characteristic of Servo No. 1 in the Position-Course, Distance and Time Computer;

Fig. 17 is a schematic diagram of the Schedule Computer;

Fig. 17a shows the construction of the clock-driven potentiometers of Fig. 17.

Figure 19:
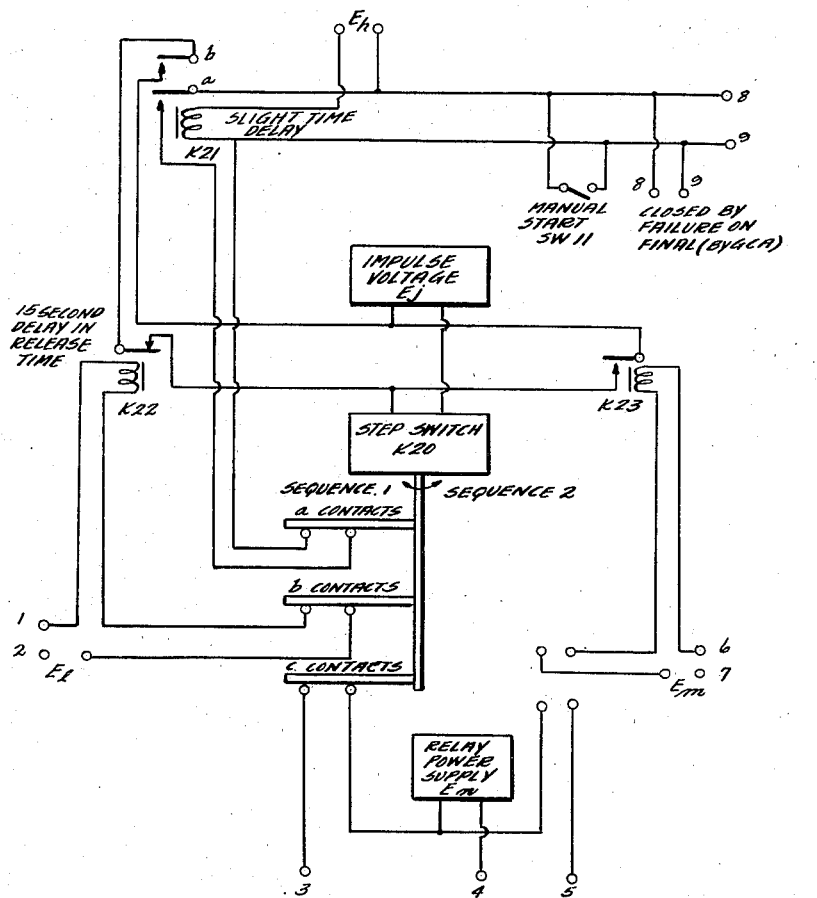

Fig. 18 is a schematic diagram of the Schedule Correction Computer;

Fig. 19 shows the Master Sequencing Unit;

Fig. 20 shows the Signal Selector Unit;

Fig. 21 shows the construction of the Course Coding Commutator of the Signal Selector Unit.

Fig. 22 shows schematically the course computing and coding portion of the Signal Selector Unit;

Fig. 23 shows the altitude coding commutator and associated circuit of the Signal Selector Unit;

Fig. 24 shows the speed coding commutator and associated circuit of the Signal Selector Unit; and Fig. 25 shows a modification of the course coding circuit to permit transmission of rate-of-change course information.

Fig. 1 shows the type of air traffic control system in which the DATAC described herein would normally be used. It consists of a volumetric radar system 20 which collects three-dimensional data on aircraft in the control area and applies this data to a series of automatic tracking units 21. Each of the tracking units has an output consisting of data applying to a single specific aircraft only. The apparatus indicated generally at 22 determines, by means of IFF, beacons, direction finding or other methods, the identity of the various aircraft and their intentions or desires. If an aircraft wishes to land it is assigned a DATAC channel 23, there being one DATAC channel for each aircraft under control. The DATAC thus assigned to the aircraft then determines the safest and most efficient procedures for controlling the aircraft from its identification position to a specific location, termed the Turn-On point, about 5 to 8 miles downwind of the runway, and transmits the necessary instructions to effect this maneuver to the aircraft over one of the channels of a suitable radio communications system 24.

The first problem to be encountered by the DATAC is one of ensuring that newly reporting planes are in suitable positions from which to start their approaches. Unsuitable positions include those occupied by aircraft which are too close to the field so that their maneuvers will interfere with the normal traffic patterns, those of aircraft which are in unsuitable areas so that their approaches will cross directly over the take-off pattern or the radar set, and those occupied by aircraft which are too high to make an approach with a standard rate of descent.

Once a plane is correctly positioned for an approach, the DATAC solves several problems. The first of these is to insure adequate time-spacing of aircraft. The most critical point, at which this spacing must be most accurate, is the turn-on point where aircraft turn onto and start flying their final approaches. At all other places, the difference of aircraft air speeds may make passing desirable and therefore dictates the use of space rather than time separations. From the turn-on point to touchdown, however, the aircraft must fly straight, accurate paths and passing must be forbidden. In all cases, the characteristics of the air field in use determines the minimum separation time between successive landing aircraft which must be exceeded if safe conditions are to exist. If an allowance for errors is added to the minimum separation time, an optimum spacing time is obtained. The DATAC makes use of a series of discrete, permissible times of arrival at the turn-on point based on an arbitrary schedule. For example, if the optimum spacing is 1½ minutes, with 10 seconds allowable error, aircraft are always scheduled to pass the turn-on point between 10 seconds before and 10 seconds after multiples of 1½ minutes. While this procedure is not a completely dynamic one, its use greatly simplifies the problem.

When a plane has been assigned the earliest possible turn-on arrival time, which must not conflict with that of any other aircraft, the DATAC determines the path in space and time which the aircraft should follow. In establishing an approach path the computer uses both course control and air speed, or, in other words, both space and time. There are essentially an infinite number of possible paths. The computer selects one of these in accordance with a standard procedure. As long as the aircraft correctly follows instructions the selected path will be used. If, however, the plane makes an error, the computer merely considers the situation as a new problem and determines a new path in accordance with the general procedure previously used.

The DATAC solves all situations in terms of what each aircraft should do, and therefore its solutions are of the most desirable type from the standpoint of usability. In cases where the transmitted information is to be fed directly into the automatic pilot a change of course is sent as a rate of turn and a change of altitude as a rate of descent or ascent. In cases where flight information is to be displayed to the pilot, rather than being fed directly to the automatic pilot, it is preferable to transmit the correct course to be flown rather than a rate of turn. Altitude information as a rate, however, is suitable for manual as well as automatic control.

In performing the function briefly outlined above the overall action of a DATAC unit may be divided into three principal phases or sequences: the first or starting sequence involves ensuring that the aircraft is in a suitable position from which to make an approach; the second or main sequence carries out the approach until the aircraft is turned over to the final landing aid at a position, the turn-on point, 5 to 8 miles downwind of the runway; the third or final sequence is concerned mainly with missed final approaches and other special emergencies occurring while the aircraft is under control of the landing aid.

The input information which each DATAC unit receives from the volumetric radar and tracking units, shown in Fig. 1, is as follows:

(1) Aircraft range and azimuth coordinates measured from the turn-on point (Fig. 2) with the azimuth offset so that zero azimuth is aligned with the runway, making the approach path at zero degrees from the turn-on point, the primary data being in the form of angular displacements of rotating shafts.

(2) Aircraft ground speed in the form of steady voltages. In addition, standard air speed depending only on aircraft type, is set in manually.

(3) Altitude in the form of steady D. C. voltages.

(4) Aircraft course in the form of a steady voltage.

Two features of the data requirements stated above need further comment. First, since the range and azimuth are measured from a specific point other than the location of the radar set, a change in coordinates of the radar data is necessary. This can be done without great difficulty by known methods. Problems of multiple air fields or runways merely involve use of different coordinate changes. DATAC's may either be set up for the different final approaches on a semipermanent basis, or may be continually altered according to traffic requirements.

The DATAC computer delivers to the data transmitters electrical signals providing discrete, specific flight instructions.

The above mentioned three sequences of DATAC operation will now be described in more detail:

*First sequence*

The existence of regions which do not provide suitable positions from which to start approaches has been previously noted. The areas shown in Fig. 2 are determined rather arbitrarily, but are believed to be the simplest which meet all requirements. To prevent interference during the critical positions of the traffic patterns, Area "A" is chosen with the turn-on point (the point of highest aircraft concentration) at its center. Its radius is selected to include the turns to the final approach, the final approach and landing regions, and the first few miles of the take-off and go-around patterns. For a 6-mile final approach, a suitable radius for Area "A" is 12 miles. Area "B" must be such that the most direct flight patterns from positions just outside it will not bring planes too close to the field or the radar set. These conditions are most easily met by having its width the same as the diameter of Area "A."

If an aircraft is first identified within Area "A," it is desirable to remove it from that region as soon as possible. This is done most simply by having it fly the reciprocal of its bearing to the turn-on point, from which $\theta$ (Fig. 2) is measured. For Area "B" a choice is possible; all the aircraft may be directed along a course of 270° or else they may fly either 90° or 270°, depending on their positions within the area. The former solution is preferable because it is simpler and it will permit more pilots to make the preferred left turns to the final approach.

The problem of ensuring suitable starting altitudes is complicated by the fact that the permissible altitude for a given position is a function of the pattern flight-time, a quantity which cannot be determined at this stage of the operation. It is therefore necessary to have the maximum starting altitude a function of range. This procedure neglects the range of air speeds which will be encountered, but also assumes a direct approach without deviations. A fairly safe criterion, which should permit even very high speed aircraft to descend at reasonable rates, is to set the maximum altitude (feet) equal to $1200+200r$ (miles), the constant 1200 equalling the proper altitude at the turn-on point where $r=0$. If an aircraft is above this altitude, or if it is below the minimum permissible altitude, $100r$, it must take corrective action before it can proceed to the next sequence.

Summarizing the actions of the first sequence:

(1) Aircraft are permitted to move to the second sequence only when they are outside Areas "A" and "B," and are within the specified altitude limits.

(2) Aircraft in Area "A" are given courses $\phi=\theta$ degrees to fly (see Fig. 3).

(3) Aircraft in Area "B" are given a course of 270° to fly.

(4) Aircraft with altitudes (feet) above $1200+200r$, where $r$ is in miles, are ordered to descend.

(5) Aircraft with altitudes below $100r$ are given instructions to climb.

*Second Sequence*

As soon as control passes to the second sequence a number of sub-computers begin to function. The actions of these computers are as follows, with reference to Fig. 3:

(a) A "Position-Course" computer determines the direct-pattern flight heading ($\phi_d$) for the aircraft, as a function of its momentary position. This heading must be tangent to a circular final turn which ensures that the aircraft is properly aligned when it passes the turn-on point. Normally, different types of aircraft would prefer the use of final turns of different radii but, for simplicity, a standard turn with a radius large enough (3 miles) for high speed planes is used.

(b) A "Position-Distance" computer determines the length of the direct flight pattern ($d$).

(c) The direct-pattern flight time ($t_d$) is determined from $d$ and the aircraft velocity. To avoid fluctuations which radar determined velocity might introduce, the cruising speed with wind correction ($v'$) of the type of aircraft in question may be used.

(d) Of the various discrete, permissible arrival times a "Schedule Computer" selects the earliest unoccupied one for which the time-to-go is greater than $t_d$ minutes. After the arrival time has been selected, the computer diminishes. This initial time-to-go in step with the passage of time so as to continuously present the remaining time-to-go ($t_s$) until the scheduled arrival time. "Emergency" aircraft may be assigned the earliest possible arrival time even at the expense of displacing other aircraft.

The computers described above provide four basic pieces of data: the direct-pattern heading ($\phi_d$), the direct-pattern distance ($d$), the direct-pattern flight time ($t_d$), and the scheduled time-to-go ($t_s$). These data are used to determine a suitable path in space and time for the aircraft to follow. Since variation of air speed is both an inefficient procedure and a relatively difficult one for pilots to follow, the major control parameter is the flight course. Excess time may be consumed with course variation by two means: (1) orbiting, and (2) flying an indirect route. Orbiting has the advantage of keeping an aircraft in the same general position with respect to the airfield while large amounts of time can be spent, but suffers from a disadvantage in that time must be used up in discrete units of about 2 minutes (for a complete orbit). An indirect course procedure is more flexible in that any desired amount of time may be spent; but it requires continual and often extensive changes of aircraft positions, which may introduce certain difficulties. A combination of the two methods is used, thereby incorporating the best features of each.

An indirect course is most easily obtained by having an aircraft fly at a specific angle with respect to the direct-pattern heading ($\phi_d$). If the schedule correction angle $\beta$, measured from the direct pattern heading ($\phi_d$), is made a function of the ratio $R=t_s/t_d$, approach paths conforming to almost any desired features can be obtained. In general it is desirable to use a pattern which keeps aircraft at a great range as long as possible, since this minimizes both the azimuth covered by the overall track, and the maximum concentration of aircraft per unit area. It also decreases the danger of the path becoming a spiral as the value of $t_d$ becomes small. Figs. 4a and 4b show two patterns using different relationships between $\beta$ and R. Pattern 2 is unsuitable because of (1) the great range of azimuths traversed, (2) a tendency to spiral, and (3) the sharp turn required at the end of the track.

Two further steps are desirable to protect the offset-course technique from being rendered ineffective. The first of these is a system of switches to change the sign of the offset angle $\beta$. These will reverse the direction of travel at suitable positions, and prevent aircraft from traversing excessive ranges of azimuth. Whenever $\beta$ is large, the reversal will involve a great change of course (up to 180 degrees), but this will happen only when considerable time can be spared. When R approaches unity and little time can be wasted, the change of course will be small. The second safety measure arises from the need to avoid any tendency either to spiral or to require sharp turns when $t_d$ approaches zero. This is done by having the mechanism cease to operate when $t_d$ reaches a low value, such as 1 minute (or when the range is about 2 miles). At that time if the ratio R is within certain limits the run is successful; otherwise the operation has failed and must be repeated.

Figs. 5a–5d illustrate the above described offset-course technique. Fig. 5a shows the relationship between the direct pattern flight heading ($\phi_d$) and the offset or schedule correction angle $\beta$ for aircraft $A_1$ and $A_2$. Fig. 5b shows offset courses for two aircraft $A_1$ and $A_2$ in which reversals of the sign of $\beta$ occur at $\theta=240°$ and $\theta=120°$ respectively. Fig. 5c illustrates the fact that when $\beta$ is large, approaching its maximum value of 90°, the change in course, which approximately equals twice $\beta$, approaches 180° or a complete reversal. Fig. 5d illustrates a case where $\beta$ is small and a correspondingly small course change is required.

The adopted procedure is to use offset-course flight to the greatest degree possible, and to use orbiting only when the time to be expended is greater than the former technique can handle. The two methods must overlap so that no condition can exist when neither can be used. It is therefore necessary to set up certain criteria as follows:

(1) Maximum value of R for which an indirect pattern may be started=2.

(2) Minimum range for starting approach (radius of circle A in Fig. 2)=12 miles.

(3) Minimum value of range for which $\beta$ will be determined=2½ miles.

(4) Acceptable range of R when $r=2½$ miles within which approach may be considered satisfactory=0.8 to 1.2.

For a 240 mile-per-hour aircraft at minimum starting range, $d$ will be at least 12 miles and $t_d$ at least 3 minutes. The maximum time which can be consumed by offset-course flying will also be about 3 minutes. This is large enough to eliminate the possibility of an orbit being started which will use up more time than is available.

Thus far all attention has been centered on the case where aircraft have more time to use than is necessary ($R>1.0$). Since the computer will permit a plane to start its approach only when this condition holds, situations where $R<1.0$ should be rare. However, adverse winds, aircraft difficulties, and pilot errors may cause them to arise. Aircraft will then be flying a direct-pattern course and air speed will be the only control parameter available. Therefore if the value of R ever drops below 0.98, air speed control for the rest of the operation must be substituted for offset-course methods.

Cases of $R<1.0$ should occur mainly when aircraft ground speeds are less than the values set in for computing $t_d$. Under such conditions $$\frac{dR}{dt} = \frac{R_{v'} - v}{d}$$

where $v$ is the actual speed and $v'$ the value set in. It is necessary to set $$\frac{dR}{dt}$$

equal to a function which will bring about the desired corrective action. Using the function $$\frac{1-R}{t_s}$$

there will result a desired air speed of $$v_0 = \frac{v'}{R^2}$$

and instructions to effect this can be transmitted to the aircraft. It will be noted that this operation requires use of radar determined speeds if rate data is to be transmitted. Previously these had not been used because of the fluctuations likely to be present. However, when $R<1.0$, planes will be travelling radially, the velocity variations will be at a minimum, and the data should be usable.

Throughout the procedures described above, continual altitude adjustments are also made. Although most aircraft can lose altitude at a rate greater than 500 feet per minute without difficulty, in general it is poor policy to require them to do so. Since collision avoidance may require level or climbing flight over some portion of the pattern, it is advisable to make the standard glide path more gentle, for example, 200 feet per minute. The following can therefore be set up as basic altitude rules:

(1) If the altitude (± about 200 ft.) is greater than $200t_s$, the plane should descend at a rate of 500 feet per minute, and (2) If the altitude (± about 200 ft.) equals $200t_s$, the plane should descend at 200 feet per minute.

(3) If the altitude is is less than $200t_s$, the plane should climb at 200 feet per minute.

(4) If the altitude is less than $100r$, the plane should climb at a rate of 500 feet per minute.

(5) If the altitude is above $500t_s$, an emergency signal may be transmitted in an effort to increase the rate of descent.

(6) If the altitude is at any time greater than $1000t_s$, the run is a failure and must be restarted.

The aircraft has now been provided with instructions or data for suitable control of the basic flight parameters, course, air speed and altitude. The only remaining function to be performed within this sequence is to prepare the plane for its final approach. This involves decreasing air speed to the final approach value and lowering flaps and landing gear. These comprise a series of events so interrelated that a single instruction will be adequate to start all necessary action. If an instruction to "Prepare for Final Approach" is issued when an aircraft is 2½ to 3 miles from the turn-on point ($r=2½$ to 3), all types of planes should have completed the necessary action within a few seconds either before or after they pass that point. The next and final instruction to be transmitted during the Second Sequence can be given when planes are 1 to 2 miles from the turn-on point; it will simply inform them that they are cleared for a final approach and that they should switch (or will be switched) to the appropriate landing aid.

Since the decrease in air speed is not started until 3 miles before the turn-on point, while the transmission of $t_s/t_d$ information ceases when $r=2½$ miles, the former action will not have time to produce any appreciable effect on the latter data. There is still a question regarding the differences in aircraft characteristics having a sufficiently large effect on the final approach air speed (and the decrease thereto) to promote danger of conflict. Unfortunately, aircraft will have varying approach speeds and the planes with the slower speeds will lose time during both the decrease and the approach with respect to faster planes. Furthermore, the faster aircraft cannot be slowed down earlier in the flight pattern, as flying any distance at final approach speed introduces danger of engine overheating. These factors may produce time variations as large as 1 to 1½ minutes between planes. This will definitely limit either the types of planes which can use an air field or the landing rate which can be established without danger of conflict at either the turn-on point or the airport. The best that can be done is to have slightly different scheduled turn-on point arrival times for the fast and slow planes and thereby split the time variation equally between the turn-on point and the air field. Thus, a slow plane might be scheduled to arrive at the turn-on point 15 seconds ahead of the normal arrival time, since during the final phase it will lose 30 seconds with respect to a faster aircraft.

Summarizing the actions of a DATAC unit during the Second Sequence:

(1) Three basic quantities are determined as a function of aircraft position and speed. These are the direct pattern heading ($\phi_d$), distance ($d$), and flight time ($t_d$).

(2) From these, the earliest unoccupied arrival time at the turn-on point for which the time-to-go exceeds the direct pattern flight time $t_d$ is selected, and this initial time-to-go is diminished in step with the passage of time to continuously provide the remaining time-to-go ($t_s$) until the selected arrival time. In the case of emergency aircraft, the earliest arrival time, occupied or unoccupied, that meets the above condition is selected.

(3) Depending on the ratio $R=t_s/t_d$, either an offset angle, or orbiting (to be followed eventually by an offset angle), is determined. The offset angle $\beta$ is either added to or subtracted from $\phi_d$ depending on aircraft position, and the resulting angle $\phi_0$ is the course to be flown.

(4) When $R<1.0$ velocity instructions are transmitted directly to the plane so that it will achieve a ground speed $v_0=v'/R^2$.

(5) Throughout the operation, altitude is adjusted so that the plane will approach a 200-feet-per-minute glide path.

(6) Failures, which will require restarting the operation, will occur whenever specific altitude or $t_s/t_d$ ratio limits are exceeded.

(7) Near the end of the Second Sequence, instructions are transmitted to prepare aircraft for the final approach and to transfer to the final landing aid.

Third Sequence

As mentioned previously, interest in the Third Sequence is confined entirely to the problems which may arise when an aircraft misses an approach in some manner. The simplest procedure in this situation is to restart the whole operation with the First Sequence. After the Second Sequence therefore the First Sequence should be repeated; but this time the equipment should be kept inactivated unless a suitable signal from the final approach system is received.

DATAC design

The major components of a DATAC computer are:
(1) Master Sequencing Unit
(2) First Sequence Unit
(3) Second Sequence Unit consisting of:
   (a) Position-Course, Distance and Time Computer
   (b) Schedule Computer
   (c) Schedule Correction Computer
   (d) Signal Selector Unit
(4) Third Sequence Unit The Master Sequencing Unit is most simply described after considering the various other sections of the DATAC. For ease of understanding, however, it is desirable to present a brief account of its functions beforehand. These functions are:

(1) Based on the situation at a given time, the unit either remains set on a given Sequence or it will move to the next Sequence.

(2) When set on a given Sequence, the unit makes the necessary connections to permit the components of the Sequence Unit assigned to that Sequence to function and the outputs of that unit to be transmitted.

(3) When set on a given sequence, the unit prevents the components of all other Sequence units from operating; holds these components in a suitable "Ready" position; and prevents false results from being transmitted.

First Sequence Unit

The functions of the First Sequence Unit are:

(1) To permit aircraft to move to the second sequence only when they are outside both Areas "A" and "B" and are within specified altitude limits.

(2) To give courses of $\phi_0=\theta_0$ to aircraft in Area "A" and $\phi=270°$ to aircraft in Area "B."

(3) To instruct aircraft with altitudes (feet) above $1200+200r$ (miles) to descend at 500 feet per minute while orbiting; to instruct those below $100r$ to ascend at 500 feet per minute while orbiting.

The general principles used in the First Sequence Unit are:

(1) The presence of aircraft in Areas "A" and "B" are indicated by a short circuit established across suitably shaped, solid contact areas.

(2) The altitude limits are generated by two linear potentiometers mounted on the rotating range shaft, and the output of these is compared, in a simple electronic circuit, with the actual aircraft altitude.

The details of the First Sequence Unit are shown in Fig. 6. Terminals 1—2 and 3—4 of the First Sequence Unit are connected to the Master Sequencing Unit. When there is a closed circuit between terminals 1—2 the Master Sequencing Unit holds the DATAC on the First Sequence. Whenever the DATAC is on the First Sequence the Master Sequencing Unit applies a voltage to terminals 3—4 which energizes relay $K_3$ and permits the outputs of the First Sequence Unit to be passed to the signal selector unit.

The azimuth $\theta$ and range $r$ of the aircraft, both measured from the turn-on point, are derived from a tracking unit of the volumetric radar set (Fig. 1) and applied as angles of rotation to shafts 25 and 26, respectively. If $r$ is equal to or less than the radius of Area "A" (Fig. 2) the Area "A" contact 27 on shaft 26 is closed and relays $K_{1a}$ and $K_{1b}$ are energized. Actuation of $K_{1a}$ closes the circuit between terminals 1—2 holding the DATAC in the first sequence. Actuation of $K_{1b}$ applies the full value of voltage $E_1$ through $K_{3a}$ to the signal selector unit. The full value of $E_1$ represents an angle of 180° which, as will be seen later, has added thereto in the Signal Selector Unit an angle of $\theta+180°$, so that the resultant course is $\phi_0=\theta$ as required.

If the aircraft is in Area "B" the values of $\theta$ and $r$ will be such that the Area "A" contacts 27 are open and the Area "B" contacts 28 are closed. The designs of the Area "B" contacts are shown in Figs. 7a and 7b. Closure of contacts 28 actuates relays $K_{2a}$ and $K_{2b}$. Actuation of $K_{2a}$ closes the circuit between terminals 1—2 and holds the DATAC in the First Sequence. Actuation of $K_{2b}$ connects the slider $P_1$ through $K_{3a}$ to the Signal Selector Unit and applies thereto a direct voltage equal to the angle $90°-\theta$. As will be seen later, the Signal Selector Unit adds $180°+\theta$ to this angle to produce the required course $\phi_0=270°$.

Minimum and maximum altitudes for any particular value of $r$ are established by D.-C. voltages supplied by $P_2$ and $P_3$ the moving contacts of which are actuated by the $r$-shaft 26. The output potentials of $P_2$ and $P_3$ are applied to the grids of $V_{1b}$ and $V_{2a}$, respectively. A positive D.-C. voltage proportional to aircraft altitude is supplied by the volumetric radar set to terminal 29 and thence to the grids of $V_{1a}$ and $V_{2b}$. If the aircraft altitude is above the minimum altitude represented by the voltage on $V_{1b}$ the current flow through the common cathode resistor 30 due to $V_{1a}$ is sufficient to maintain $V_{1b}$ in cut-off. However, if the altitude is below the minimum established by $P_2$ the current flow in resistor 30 due to $V_{1a}$ is insufficient to bias $V_{1b}$ below cut-off so that the conduction of this tube actuates relay $K_4$. Closure of contacts $K_{4a}$ produces a connection across terminals 1—2, holding the DATAC in the First Sequence. Closure of contacts $K_{4c}$ closes the circuit between terminals 31 indicating that the altitude is to be increased at a predetermined rate. Closure of contacts $K_{4b}$ closes, through $K_{3b}$, the circuit between "Orbit" terminals 32.

If the altitude of the aircraft is below the maximum established by $P_3$ the voltage on the grid of $V_{2b}$ will be insufficient to overcome the bias on this grid due to the $V_{2a}$ current in resistor 33 and $V_{2b}$ will be maintained in cut-off. However, if the altitude exceeds this maximum the voltage on the grid of $V_{2b}$ will rise above cut-off and relay $K_5$ will be energized. Closure of contacts $K_{5a}$ establishes a connection across terminals 1—2 to hold the DATAC in the First Sequence. Closure of contacts $K_{5c}$ establishes, through $K_{3c}$, a connection across the terminals 34 indicating that the altitude is to be decreased at a predetermined rate. Closure of contacts $K_{5b}$ establishes, through $K_{3b}$, a connection across "Orbit" terminals 32.

When the aircraft has satisfied the conditions of being outside Areas "A" and "B" and within the prescribed altitude limits for its range, the connection between terminals 1—2 is broken and the Master Sequencing Unit (after a brief delay to ensure there has been no temporary malfunction) moves automatically to the Second Sequence. During the Second Sequence relay $K_3$ is de-energized by the Master Sequencing Unit.

Second Sequence Unit

The Second Sequence Unit performs the seven functions outlined previously at the end of the description of the Second Sequence. The Second Sequence Unit of an individual DATAC is shown in block form in Fig. 8 and is seen to contain three subcomputers, namely: The Position-Course, Distance and Time Computer, the Schedule Correction Computer and the Signal Selector. The Schedule Computer which is common to all DATACs is also shown.

The Position-Course, Distance and Time Computer receives the aircraft azimuth $\theta$ and range $r$ from the volumetric radar set and has the aircraft cruising speed $v'$ set in manually. From these data the computer determines the direct-pattern course ($\phi_d$), direct-pattern distance ($d$) and the direct-pattern flight time ($t_d$). The relationships used are illustrated in Fig. 9. Instead of solving directly for $\phi_d$, the angle $\delta$ between the direct-pattern course and the bearing of the turn-on point from the aircraft is determined. If $\delta$ is added to (when $\theta>180°$)

or subtracted from (when $\theta<180°$), $\theta+180°$, the result is $\phi_d$.

For a specific value of azimuth, $$\frac{\delta}{\text{Value of }\delta\text{ at final turn }(=\delta_{max})}=$$

$$\text{function of }\frac{\text{Range to final turn border }(=r_{min})}{r}$$

Since both $\delta_{max}$ and $r_{min}$ are functions of $\theta$, this can be written $$\delta=\delta_{max}f\left(\frac{r_{min}}{r}\right)=f_3(\theta)f_2\left[\frac{f_1(\theta)}{r}\right]$$

A similar type of expression can be used to determine $d$.

$$d=r+\Delta r$$

$$\Delta r=\Delta r_{max}f^1\left(\frac{r_{min}}{r}\right)=f_5(\theta)f_4\left[\frac{f_1(\theta)}{r}\right]$$

Within the second and third quadrants, the physical interpretations of some of these functions are:

| Function | Quadrant II | Quadrant III |
| --- | --- | --- |
| $f_1(\theta)$ | $K\cos(\theta-90°)$ | $K\cos(\theta+90°)$ |
| $f_3(\theta)$ | $180°-\theta$ | $\theta-180°$ |
| $f_5(\theta)$ | $K'(\pi-\theta)$ | $K'(\theta-\pi)$ |

The values of $K$ and $K'$ are determined from the diameter of the final turn which in this case is 6 miles. In the first and fourth quadrants the above interpretations do not apply and the functions in the computer are simply fitted to empirical and calculated data.

The schematic diagram of the Position-Course, Distance and Time Computer is shown in Fig. 10. The computer receives $\theta$ and $r$, in the form of angular displacements of shafts 25 and 26, from one of the tracking units of the volumetric radar set and the cruising speed $v'$ is set in manually or may be obtained by radar also. In this figure unit voltages are used for the input voltages $E_4$, $E_5$ and $E_6$ under which condition the proper scale factors for converting the final voltages to degrees are 312.5 degrees and 21.1 miles per volt, respectively. A constant D. C. voltage $E_4$ is applied across potentiometer $P_4$ which is actuated by the shaft. The resistance characteristic of this potentiometer is shown in Fig. 11 and conforms to the function $f_1(\theta)$. The output of $P_4$, which is proportional to $f_1(\theta)$, is applied across $P_5$. $P_5$ is actuated by the $r$ shaft and has a response proportional to $1/r$, its characteristic being shown in Fig. 12. The output of this potentiometer, therefore, is a product equal to $$\frac{V_4 f_1(\theta)}{r}$$

$V_4$ in this case being unity, which is fed to Servo No. 1. This servo has an output which is linear with respect to the input voltage, but which is divided into two sections with different slopes as shown in Fig. 13. This characteristic is provided so that the region which includes the vast majority of the traffic situations, $$0<\frac{f_1(\theta)}{r}<1.2$$

will have a wide range of output displacement. The maximum value which $$\frac{f_1(\theta)}{r}$$

can attain before the Master Sequencing Unit switches to the next sequence is 3.0, but this is physically an almost impossible event.

Potentiometers $P_6$, actuated by the Servo No. 1 shaft, and $P_7$, actuated by the $\theta$ shaft, complete the calculation of $\delta$. The output of $P_6$ is proportional to $$f_2\left[\frac{f_1(\theta)}{r}\right]$$

and that of $P_7$ is proportional to $f_3(\theta)$. The output of $P_7$, therefore, is the product $$f_3(\theta)\cdot f_2\left[\frac{f_1(\theta)}{r}\right]$$

which equals $\delta$. The characteristics of $P_6$ with respect to both the displacement of Servo No. 1 and its input voltage is shown in Fig. 14, and that of $P_7$ in Fig. 15. The situation wherein an aircraft is within the area described by the radius of the final turn corresponds to the case where $$\frac{f_1(\theta)}{r}>1.0$$

There is no single physically correct course for such a condition, so the curve of $P_6$ has merely been extended in a manner to insure that planes will be directed beyond the limits of this area. Although travel inside the turn will probably occur frequently, the distance traversed should always be small; consequently, this procedure should be sufficiently accurate. Since $\delta$ must be either added to or subtracted from $\theta+180°$, both positive and negative values of the D. C. voltage $E_5$ must be available. The proper one of these is selected by switch $SW_1$ which is controlled by the position of the $\theta$ shaft. In either case the voltage must equal 312.5° on whatever voltage-degree scale is used. Since, as already mentioned, $\theta+180°$ will be added to the electrical course signal in the Signal Selector portion of the equipment, this action will not be necessary at the Position-Course Computer stage. Whenever relay $K_6$ is closed by the Master Sequencing Unit, $\delta$ is transmitted to the Schedule Correction Computer where the next step in determining the correct course takes place.

Although the first steps in computing $t_d$ are similar to those for determining $\delta$, several more operations are required. These involve adding $\Delta_r$ to $r$, and dividing the whole by the cruising velocity $v'$. A. C. voltage $E_6$ is fed to a Variac whose position is controlled by manually setting in $v'$. The output is fed to two transformers $T_1$ and $T_2$. $T_1$ is a one-to-one transformer whose output, $E_7$, is proportional to $$\frac{\text{Maximum Range (50 miles)}}{v'}$$

$T_2$ has an output, $E_8$ proportional to $$\frac{\text{Maximum }\Delta r\text{ (21.1 miles)}}{v'}$$

which is applied to $P_8$ actuated by the Servo No. 1 shaft. The output of this potentiometer is then applied to $P_9$ actuated by the $\theta$ shaft. The characteristics of $P_8$ and $P_9$ and the functions they represent are shown in Figs. 14 and 16, respectively. The output of $P_9$ is the product of the two functions represented by the two potentiometers, $$\frac{f_5(\theta)\cdot f_4\left[\frac{f_1(\theta)}{r}\right]}{v'}$$

which equals $\Delta r/v'$. Meanwhile $$\frac{E_7}{V_7}$$

is applied across linear potentiometer $P_{10}$, actuated by the $r$ shaft, so that its output equals $r/v'$. Since the transformer $T_1$ is not grounded, the output of $P_{10}$ can be added to $\Delta r/v'$ and the sum will equal $$\frac{r+\Delta r}{v'}=\frac{d}{v'}=t_d$$

This result is then fed to the Main Schedule Computer.

The Main Schedule Computer differs in two major respects from the components previously discussed. Firstly, it contains the one area of operation in which all DATAC units of a single traffic control area are involved. This common area is necessary to ensure that no more than one aircraft will select a given time of arrival at the turn-on point. The second distinguishing characteristic is that the main action will take place only once during a normal operation, and this action must start at a specific time and from a specific condition (in contrast to the other components which may run continuously, with the Master Sequencing Unit directing when to use their outputs). The special requirements of the Main Schedule Computer tend to make its operation, though not its equipment, somewhat more complicated than that of the other components of the system.

The operation of the Main Schedule Computer is primarily based on two types of equipment—a clock driven potentiometer and a group of continuously rotatable stepping switches. The potentiometer contains a large number of taps (20 or more). During normal operation, a voltage proportional to the time-to-go until one of the permissible times of arrival is available at each tap. The stepping switches, one of which is required for each DATAC unit in the system, must have at least four banks of steps, each bank containing one step for each potentiometer tap. One of the banks is used for obtaining the $t_s$ voltages; one for the correct-altitude voltages; and two for the "continuity current."

The general principles of operation are as follows:

(1) The clock-driven potentiometer delivers to the corresponding steps of each stepping switch voltage ($t_s$) proportional to the scheduled time-to-go values. These voltages increase in the direction in which the switch steps, the voltage difference between two adjacent steps being proportional to the established minimum separation time at the turn-on point. The $t_s$ voltage on any given step decreases with time as the clock mechanism operates.

(2) The stepping switches are arranged so that a short circuit is produced across each pair of continuity-current steps except the pair of the steps in which the $t_s$ wiper is resting. At the step, two continuity-current wipers permit the sampling and/or breaking of the continuity-current by outside elements.

(3) The taps of the corresponding "continuity-current" steps of each stepping switch are connected in series. If a power supply is then connected across the outside continuity-current taps, a current will only flow through those steps on which no $t_s$ wiper is resting.

(4) The "rest" condition of the stepping switch has the $t_s$ wiper on its lowest possible value. When ordered by the Master Sequencing Unit, the switch starts advancing to successively higher values of $t_s$ and continues until the value of $t_s$ sampled is higher than that of $t_d$, the direct-pattern flight time. If at this step the continuity current is absent (thereby indicating that another aircraft has received that $t_s$), the switch advances to the next step. If, on the other hand, a continuity current is present, the wiper remains at that step, while external circuits break the continuity current to prevent another plane from selecting the same position at a later time.

(5) "Emergency" aircraft are provided with an artificial "continuity current." They will, therefore, stop at the first step for which $t_s > t_d$. Conflicts resulting from this action are resolved after selection of this earliest possible arrival time.

The design of the Main Schedule Computer is shown in Fig. 17. The clock-driven potentiometers $P_{11}$ and $P_{12}$, the power supplies $E_9$ and $E_{10}$, and the continuity current power supply $E_e$ are common to the whole DATAC system. All the remaining elements, unless otherwise noted, are duplicated for each unit. Stepping switch $K_{13}$ is continuously rotatable and has four banks of contacts, namely: the $t_s$ bank 35, the continuity current banks 36—37 and the altitude bank 38. Each $t_s$ contact is supplied with voltage that cyclically varies from a maximum value, representing 30 minutes (the maximum $t_s$), to zero. The voltage between adjacent $t_s$ contacts at all times represents the predetermined separation time between times-of-arrival at the turn-on point, in this case 1½ minutes. These voltages are supplied from voltage source $E_9$ by means of clock driven potentiometer $P_{11}$ shown in Fig. 17a. Similar voltages are applied to the altitude contacts 38 of $K_{13}$ by voltage source $E_{10}$ and clock driven potentiometer $P_{12}$, also shown in Fig. 17a. $E_{10}$ is proportioned in this case to equal $1500 t_s$ (max.) feet. Since, in this example, the maximum value of $t_s$ is 30 minutes, the amplitude of $E_{10}$ is made such as to equal $1500 \times 30$ or 45,000 feet. The voltage $E'_{10}$, appearing at the altitude wiper 39, therefore varies cyclically from a maximum value, representing 45,000 feet, to zero and at all times equals $1500 t_s$. The voltage is supplied to the Signal Selector Unit for use in a manner to be described later.

The continuity current contacts 35—36 are bridges in all positions except that corresponding to the position of the $t_s$ wiper 40. At this position a continuity current sampling circuit is introduced by contacts 41. For each value of $t_s$ the continuity contacts of all $K_{13}$ switches are connected in series across voltage $E_e$.

The continuity current for the step on which the $t_s$ wiper is resting must flow through relay $K_9$ and the "b" contacts of $K_{11}$ before it can pass to the contacts of the next stepping switch. $K_9$ may therefore be used to test for the existence of this current, while operation of $K_{11}$ may be used to interrupt it. Manual switch $SW_3$ may be used to bypass the system of stepping switches and thereby produce an "artificial" continuity current for emergency aircraft, while $K_{14}$ is controlled by the Master Sequencing Unit to perform the same function during the 1st and 3rd Sequences. The latter action is necessary to insure that all switches rest on the same step, the lowest, when they are not in use. The process for accomplishing this will be described later.

During the Second Sequence $K_6$ is held closed by the Master Sequencing Unit, thus permitting both $t_d$ from the Position-Time Computer and the sampled value of $t_s$ from contact 40 of $K_{13}$ to be applied to dividing Servo No. 2. The output displacement of this servo is a function of the ratio of $t_s / t_d = R$.

At the start of operation, which is initiated by application of a voltage to terminals 4—5 by the Master Sequencing Unit, the values of $t_s$, and therefore $t_s/t_d$, will be low. Under these conditions $SW_2$, actuated by Servo No. 2, is in its lower position ($R < 0.1$). $K_{10}$ is now energized, by $E_c$, and $K_9$ and $K_{11}$ are deenergized. The stepping solenoid of $K_{13}$ therefore receives impulses from $E_d$ through $K_{10}$ and $K_{11a}$ and advances. This continues until $t_s/t_d > 1.0$, at which time $SW_2$ moves to the upper position, deenergizing $K_{10}$ and opening the $K_{13}$ solenoid at the contacts of $K_{10}$. The first condition of the Schedule Computer, that $t_s$ be greater than $t_d$, is now fulfilled and the stepping solenoid receives no further pulse via the controls of $K_{10}$.

Although $K_{10}$ is deenergized by the operation of $SW_2$, $K_{11}$ is not necessarily energized since $K_{9a}$ may be open due to the absence of a continuity current. With both $K_{11}$ and $K_9$ deenergized, impulses from $E_d$ reach $K_{13}$ through $K_{9b}$ and $K_{11a}$ and step this relay once for each pulse. When contacts 41 of $K_{13}$ find a closed $t_s$ circuit a continuity current flows through $K_9$. With this relay energized current from $E_c$ flows through $K_{9a}$, $K_{11}$ and the upper contacts of $SW_2$. When $K_{11}$ is thus energized contacts $K_{11c}$ bypass contacts $K_{9a}$, making the energization of $K_{11}$ independent of the continuity current. The operation of $K_{11}$ both prevents further impulses from reaching $K_{13}$ via $K_{11a}$ and breaks the continuity current at $K_{11b}$, thereby reserving the step on which $K_{13}$ is resting. The second condition—that the selected $t_s$ be free from conflicts—is therefore met.

Three problems still remain:

(1) Resolving any conflicts resulting from the scheduling of an emergency aircraft, (2) Ensuring that $K_{13}$ starts advancing from the proper position, i. e., the lowest values of $t_s$, and (3) Ensuring that suitable action will be taken whenever a "failure" occurs (R or altitude limits exceeded).

The first of these is handled by $SW_4$ which is common to all units. When an emergency aircraft has been assigned a DATAC unit the switch $SW_3$ for that unit is closed, which bypasses the various $K_{13}$ switches and produces an artificial continuity current for the assigned unit. Under this condition the $K_{13}$ switch for the assigned DATAC advances to the first value of $t_s$ that is greater than $t_d$ and stops thereon due to the opening of $SW_2$ and $K_{10}$, $SW_4$, which has contacts for each DATAC, is then opened for one impulse of $V_d$. This can be easily accomplished manually by observing light 32 which flashes in synchronism with the $E_d$ impulses. The interval between these pulses is about five seconds in order to allow sufficient time for dividing Servo No. 2 to reach its correct position following each new position of the associated stepping switch $K_{13}$. Opening of $SW_4$ deenergizes the various relays $K_{11}$ and, in effect, requires a new sampling of the continuity currents by all units. However, except in the case of an aircraft having the same $t_s$ as the emergency plane, continuity currents will be present and deenergization of $K_{11}$ will be accompanied by energization of $K_9$ which will prevent stepping impulses from reaching $K_{13}$. With $K_9$ energized a circuit is completed through $K_{9a}$ for the reenergization of $K_{11}$ when $SW_4$ is again closed. Reenergization of $K_{11}$ breaks the continuity current at $K_{11b}$, deenergizing $K_9$, and completes the $K_{11}$ holding circuit at $K_{11c}$. For the aircraft with the same $t_s$ as the emergency plane, however, the interruption of its continuity current, due to the closed $SW_3$, will start a rescheduling process for this plane. This is brought about by the fact that, with regard to the relays associated with the DATAC assigned to the plane, the absence of a continuity current due to closure of the $SW_3$ switch associated with the DATAC of the emergency plane results in a deenergized $K_9$ which prevent $K_{11}$, by the open circuit at $K_{9a}$, from being reenergized upon reclosure of $SW_4$. With $K_{11}$ deenergized stepping impulses are applied from $E_d$ through $K_{9b}$ and $K_{11}$ or to $K_{13}$ causing this relay to step until a continuity current is found, when stepping will cease due to the opening of $K_{9b}$ provided $SW_2$ is in its upper position ($R>1.0$). Should this switch be in its lower position ($R<1.0$), stepping will continue through $K_{10}$ until a continuity current is found at a $t_s$ that is greater than the $t_d$ for the particular plane.

With regard to the second of the above problems, when the operation reaches the end of the Second Sequence after a successful approach the value of R is close to 1.0 and the values of $t_s$ and $t_d$ are small. At the end of the Second Sequence the Master Sequencing Unit simultaneously removes voltage from terminals 4—5 and applies voltage to terminals 3—4. Removal of voltage from terminals 4—5 deenergizes $K_6$. The effect of this is to apply $E_g$ and ⅔ $E_g$ to dividing Servo No. 2 via $K_{6d}$, to remove the $t_d$ voltage from Servo No. 2 at $K_{6b}$, to remove the $t_s$ voltage from Servo No. 2 and to apply it to the grid of $V_3$ at $K_{6c}$, to break the $K_{13}$ stepping circuit at $K_{6c}$ holding $K_{13}$ in its last position, to close relay $K_7$ after a slight time delay, and to close relay $K_{14}$. The application of $E_g$ and ⅔ $E_g$, which is equivalent to having $R=0.66$, causes $SW_2$ to move to its lower contact closing relay $K_{10}$. This relay bridges contacts $K_{9b}$, which are now open due to the energization of $K_9$ by closure of $K_{14}$, and establishes a stepping circuit for $K_{13}$ which includes the contacts of $K_{10}$, contact $a$ of $K_{11}$ which was deenergized by the action of $SW_2$, and the contacts of $K_{15}$. As stated above, $t_s$ at this point has a low value which is approaching zero. If $t_s$ has any value above zero, however, $K_{12}$ is energized thereby with the aid of the amplification of $V_3$. Energization of $K_{12}$ prevents the application of $V_f$ to $K_{15}$. This was previously prevented by $K_7$, the slight delay of this relay being for the purpose of preventing the application of $E_f$ to $K_{15}$ until $K_{12}$ has had time to operate. When $t_s$, which continues to decrease drops to zero, $K_{12}$ is deenergized and $E_f$ is applied to $K_{15}$. Closure of the contacts of this relay applies a stepping pulse from $E_d$ to the $K_{13}$ advancing this switch one step. Since the next higher value of $t_s$ will have not yet reached zero, being separated from the preceding value by the interval of 1½ minutes, $K_{12}$ and consequently $K_{15}$ will again be energized preventing further stepping of $K_{13}$ until the new value of $t_s$ has decreased to zero at which point $K_{13}$ advances to the next higher step, and so on. This process ensures that whenever the Schedule Computer is called upon to function switch $K_{13}$ starts searching from the lowest value of $t_s$.

Regarding the third of the above problem, since it is desirable to give aircraft which fall behind schedule ($R<1.0$) a chance to catch up, $SW_2$ is constructed to permit this. If it has once moved to the upper position ($R>1.0$), it remains there until R drops below 0.7. Before this happens, the aircraft under control will have been deemed a failure in the Schedule Correction Computer, subsequently described, and the Master Sequencing Unit will be moved to the First Sequence. It is quite possible that the operation will return to the Second Sequence before the $t_s$ at which $K_{13}$ is resting will have decreased very much. This will cause no difficulty, as the new $t_s$ to be selected will have to be at least as great as the old one was. No special action for such failure is therefore required of the Schedule Computer.

The Schedule Correction Computer is shown schematically in Fig. 18. The major functions of this computer are the final determination of the correct course ($\phi_0$) and ground speed ($V_0$) to be flown. In addition, however, it also establishes the existence of failures, and provides data to the Master Sequencing Unit for sequence control. More specifically these functions are:

(1) Whenever $R>2.0$, orbit instructions are sent to the aircraft under control.

(2) When $R<2.0$, a suitable offset or schedule correction angle $\beta$ is added to or subtracted from $\pm\delta$, defined in Fig. 9.

(3) When $R<0.98$, velocity instructions to establish a ground speed $v_0=v'/R^2$ are transmitted.

(4) When $r<2$ miles, the operation is moved to the Third Sequence.

(5) Failures are indicated when $R<0.7$. Failures are also indicated if $1.2<R<0.8$ when $r$ is less than slightly over 2 miles.

The computer receives the following data: $\theta$, as a rotation of shaft 25; $r$, as a rotation of shaft 26; cruising speed $v'$, as a rotation of shaft 42; and voltages representing $t_d$, $t_s$ and $\pm\delta$.

The offset angle $\beta$ is produced by $P_{13}$, which is actuated by the R shaft 43. The characteristic of this potentiometer is such as to provide a desired relationship between R and $\beta$ such as shown, for example, by pattern 1 in Fig. 4a. To permit addition to $\pm\delta$, this potentiometer is supplied with a floating voltage $E_{11}$ through $SW_5$. Switch $SW_5$, controlled by the $\theta$ shaft, determines whether a positive or negative $E_{11}$ will be used. Whenever $\theta>240°$, it provides a positive voltage and continues to do so until $\theta$ decreases through 120°. Negative voltage is supplied whenever $\theta<120$ degrees and remains until $\theta$ increases through 240°. This change of the sign of $\beta$ switches the general direction of travel of the control led aircraft. When $\pm\delta\pm\beta$ has been produced, several other conditions must be met before it can be transmitted to the Signal Selector:

(1) R must be less than 2.0 ($SW_9$ and $SW_{10}$ in right-hand position).

(2) Range must be greater than 2+ miles (switch $SW_7$ in left-hand position, $K_{16}$ not energized).

(3) Master Sequence Unit must be in Second Sequence ($K_{19a}$ closed).

Whenever (1) above is not met, $SW_{10}$ will be in the left position and the "Orbit" circuit will be closed through $K_{19c}$. If condition (3) is not met $SW_6$ closes causing the Master Sequencing Unit to shift control to the Third Sequence.

Velocity instructions are obtained from $P_{14}$ and $P_{15}$. The former, which is actuated by the $v'$ shaft 42, produces a voltage proportional to $v'$, while the latter, which is actuated by the R shaft, produces the function $1/R^2$. Their product, $V_0$, is sent to the Signal Selector whenever $R<0.98$ ($SW_8$ closed), $K_{16}$ deenergized ($R>2+$miles) and $K_{19}$ is energized.

Sequence control is provided by $SW_6$ and by the failure system. When $r$ decreases below 2 miles $SW_6$ is closed thus presenting a short circuit to the Master Sequencing Unit through terminals 6—7, causing transfer to the Third Sequence. The failure data is provided by two sets of contacts 44 and 45 on the R shaft. Contacts 45 close when $R<0.7$ while contacts 44 operate whenever $1.2<R<0.8$. Since current through the latter must also pass through the contacts of $K_{16}$, its data will be effective only when $R<2+$ miles ($K_{16}$ energized). Subject to this condition closure of either set of failure contacts 44 and 45 causes $K_{18}$ to be operated by $E_i$. $K_{18}$ has three contacts: one ($a$) to transmit a failure signal to the aircraft, one ($b$) to present a short circuit to the Master Sequencing Unit through terminals 6—7 and a third ($c$) to operate a "Start" circuit through terminals 8—9. The function of the latter will be further explained in connection with the Third Sequence Unit. To prevent any failure actions during the First or the Third Sequences, $K_{17}$ is energized by the Master Sequencing Unit during these periods of operation. It is provided with a 30 second delay, however, to permit the failure signal to the aircraft to be sent for that length of time even though the operation has switched to the Third Sequence.

The action of the Second Sequence Subcomputers may be summarized as follows:

this time. The schematic diagram of this unit is shown in Fig. 19 and its functions are as follows:

(1) During the First Sequence only, an open circuit between terminals 1—2 (see Fig. 6) requires the Master Sequencing Unit to move to the Second Sequence.

(2) During the Second Sequence only, a closed circuit between terminals 6—7 (see Fig. 18) requires the Master Sequencing Unit to move to the First Sequence.

(3) When on the First Sequence the Master Sequencing Unit can not switch to the Second Sequence unless manual Start Switch $SW_{11}$ has previously been closed or unless contact has been made across terminals 8—9 either by the Schedule Correction Computer (Fig. 18) as the result of a failure during the Second Sequence or by the final landing aid as a result of failure during the final landing operation.

(4) When on the First Sequence, power is supplied through terminals 4—5 to operate relays $K_3$ in the First and Second Sequence Units (Figs. 15, 17 and 18).

(5) When on the Second Sequence, power is delivered through terminals 4—5 to operate relays in the Second Sequence Unit (Figs. 10, 17 and 18).

The Master Sequencing Unit comprises a rotatable step switch $K_{20}$ having two positions marked Sequence 1 and Sequence 2. The voltage $E_j$, when applied to $K_{20}$, causes the switch to move to the other position. Assume that the computer is in operation on the Second Sequence. If this Sequence is completed successfully $SW_6$ (Fig. 18) closes when $r$ decreases below 2 miles. The resulting connection across 6—7 allows $E_m$ to operate $K_{23}$ through contacts $2b$ of $K_{20}$ which steps $K_{20}$ to the Sequence 1 position and the DATAC is finished with that particular aircraft. When the DATAC has been assigned to another aircraft start switch $SW_{11}$ is manually operated. This actuates $K_{21}$ which is kept in an energized condition by the holding circuit established through $K_{21a}$ and the $1_a$ contacts of $K_{20}$. When the aircraft is in position to proceed to the Second Sequence the connection across

| Computer | Inputs | | | Outputs | | |
|---|---|---|---|---|---|---|
| | Item | Source | Form | Item | Form | Destination |
| Position—Course, Distance and Time. | $r, \theta$ | Tracking Unit | Shaft displ | $\pm\delta$ | D. C. voltage | Sched. Correction Computer. |
| | $v'$ | Manual Setting | Shaft displ | $t_d$ | A. C. voltage | Main Schedule Computer. |
| Main Schedule | $t_a$ | Pos.-Time Comp. | A. C. voltage | $t_s$ | A. C. voltage | Dividing Servo. |
| | Allowable values of $t_s$ | Clock driven potentiometer. | A. C. voltage | $R=t_s/t_d$ | Shaft displ | Sched. Correction Computer. |
| | $t_s$ other aircraft | Other DATACS | Break in continuity | 1500 $t_s$ | D. C. voltage | Signal Selector (altitude). |
| | $\pm\delta$ | Pos.-Course Computer. | D. C. voltage | $\pm\delta\pm\beta$ | D. C. voltage | Signal Selector. |
| Schedule Correction | $r, \theta$ | Tracking Unit | Shaft displ | Orbit Signal | Closed circuit | Signal Selector. |
| | $v'$ | Manual Setting | Shaft displ | Failure Signal | Closed Circuit | Signal Selector and Master Seq. Unit. |
| | R | Dividing Servo | Shaft displ | $V_0$, Final Instructions. | D. C. voltage | Signal Selector (velocity). |

Third Sequence Unit

As already stated the Third Sequence is identical to the First Sequence and therefore the First Sequence Unit also performs as the Third Sequence Unit when called upon to do so. Therefore, after completion of the Second Sequence, the Master Sequencing Unit returns to the First Sequence, however, operation cannot proceed again to the Second Sequence unless a "Start" signal is received by the Master Sequencing Unit indicating a failure either during the Second Sequence or during the final landing operation. The "Start" signal takes the form of a short circuit across terminals 8—9 of the Master Sequencing Unit. This short circuit can be effected by the Second Sequence Unit or the final landing aid.

Master Sequencing Unit

The Master Sequencing Unit has been briefly described already, but its detailed description was deferred until terminals 1—2 is broken by the First Sequence Unit (Fig. 6) and after a delay $K_{22}$ releases. Stepping voltage is then applied to $K_{20}$ through $K_{21b}$ and $K_{22}$, which moves the switch to the Sequence 2 position and places the Second Sequence Unit in operation.

If a failure occurs during the Second Sequence the operation, in effect, is to automatically close $SW_{11}$ so that the aircraft can restart with the First Sequence and, when completed, proceed normally to the Second Sequence again. Failures occur when $1.2<R<0.8$, if $r<2+$ miles, or whenever $R<0.7$. Either situation results in energization of $K_{18}$ (Fig. 18). Actuation of this relay bridges terminals 6—7, causing switch $K_{20}$ of the Master Sequencing Unit to move to the Sequence 1 position, and also bridges terminals 8—9 which actuates $K_{21}$ thus placing the Master Sequencing Unit in condition to move to Sequence 2 when $K_{22}$ is deenergized and its contacts close at the completion of the First Sequence.

If a failure occurs during the final landing operation, the Master Sequencing Unit will have already switched to the Sequence 1 position as a result of the successful completion of the Second Sequence and closure of SW$_6$ (Fig. 18). In this case, the final landing aid closes the circuit between terminals 8—9 of the Master Sequencing Unit so that the First and Second Sequences are repeated as in the case of failure during the Second Sequence.

*Signal Selector Unit*

The purpose of the Signal Selector Unit is to convert the results obtained from the various computers of the DATAC unit into data suitable for transmission to aircraft. Two factors influence the form in which information is transmitted: (1) simplicity of transmission and (2) the relative ease with which instructions can be followed by pilots, either automatic or manual. Depending upon these factors the following types of data may be used:

(1) *Correct route instructions.*—The correct course ($\phi_0$), altitude ($A_0$) and velocity ($v_0$) are transmitted directly, for example: Course 320°, altitude 7500 feet and velocity 230 M. P. H.

(2) *Change of route instructions.*—The changes necessary to comply with the DATAC requirements, such as: turn right 60°, decrease altitude 1000 feet and increase speed 30 M. P. H.

(3) *Rate of change instructions.*—Depending upon the magnitude of the changes required, specific rates may be transmitted, for example: turn right at 2° per second, descend at 500 feet per minute and increase air speed at rate 2.

The Signal Selector Unit shown schematically in Fig. 20 utilizes the correct route method for course information and rate of change instructions for the remaining data. Instructions are transmitted to the aircraft during both the First and Second Sequences. The action of the Signal Selector Unit during the First Sequence will be described first.

As already explained, during the First Sequence the airplane is instructed to fly a course $\phi_0 = \theta$ if in Area "A" (Fig. 12) and a course $\phi_0 = 270°$ if in Area "B." The courses are supplied to the signal selector unit in the form of D. C. voltages proportional to 180° in the case of Area "A" and 90°−$\theta$ in the case of Area "B." The Signal Selector Unit adds $\theta + 180°$ to these courses to produce the desired courses of $\theta$ and 270°, which are then coded for transmission to the airplane. The D. C. voltage representing either 180° or 90°−$\theta$, supplied by the First Sequence Unit, is applied to Coincidence Circuit No. 1 through the $c$ contacts of relay K$_{21}$ which is energized during the First Sequence. The second input voltage for the coincidence circuit is obtained from the rotating contact of potentiometer 16. The D. C. voltage across this potentiometer varies from a negative value proportional to −180° through 0 to an equal positive value representing +180°. Since the input voltages representing 180° and 90°−$\theta$ are always positive the negative portion of the potentiometer is not utilized in this Sequence, however, it is necessary in the Second Sequence as will be seen later. When the two applied voltages are the same in amplitude and sign a pulse is produced by the coincidence circuit, which may be of any known type accomplishing this result. The rotating contact of P$_{16}$ is driven at the same speed as shaft 46 which is rotated at constant speed by motor 47. A coding commutator 48 is also mounted on shaft 46 and, when a pulse is applied thereto by the coincidence circuit, generates a signal representing the course to be flown, $\phi_0$, in electrical binary form. The construction of the commutator is shown in Fig. 21 which is believed to be self-explantory. Division of the commutator into 240 steps permits transmission of course information with an accuracy of 1½ degrees and requires an 8 digit binary code. Higher accuracy may be obtained by the use of more commutator divisions and the required greater number of digits. Also, any other suitable coding device may be used.

The body of the potentiometer P$_{16}$, which carries the resistance winding, is driven at a 1:1 ratio by the $\theta$ shaft and therefore assumes an angular position equal to the angle $\theta$. By proper adjustment of the angular relation between the coding commutator and the wiper of P$_{16}$, and between the coding commutator pick-off and the zero position of the $\theta$ shaft, the output of the coding commutator may be made equal to the input angle (in this case 180° or 90°−$\theta$)+($\theta$+180°). These relationships are illustrated in Fig. 22. Since an output from the commutator occurs only once in each revolution of the commutator it is necessary to store this output in order to supply steady digital course information to the transmitter. This is accomplished by Storage System No. 1 which may be of any suitable type, such, for example, as an R–C integrating circuit.

Altitude instructions are also supplied to the aircraft during the First Sequence. As may be seen in Fig. 6 this information is supplied in the form of closure of an electric circuit and, since the transmitting equipment can utilize the information in this form, no further processing by the Signal Selector Unit is required.

During the Second Sequence the aircraft is supplied with course, altitude and velocity instructions and with "Orbit" or "Failure" signals based on the value of R. Other routine instructions, such as to prepare for final approach, etc. are also to be transmitted during the sequence.

During the Second Sequence course information is supplied to the Signal Selector Unit from the Schedule Correction Computer, Fig. 18, as a D. C. voltage representing the angle ±δ±β. The Unit adds $\theta$+180° to this voltage to produce the course $\phi_0$ which is converted into digital form. During the Second Sequence K$_{21}$ is deenergized and K$_{19}$ (Fig. 18) is energized so that the voltage representing ±δ±β is applied to Coincidence Circuit No. 1 instead of the voltage representing 180° or 90°−$\theta$ which was applied during the First Sequence. The operation of the Signal Selector Unit in converting this voltage into $\phi_0$ in digital form is the same as its operation during the First Sequence described above. Since the angle ±δ±β may range from −180° to +180° both positive and negative halves of P$_{16}$ are required in this operation.

Provision must be made for transmission of the following altitude instructions during the Second Sequence:

(1) Ascend at 500'/minute ($a$±200'<200$t_s$ or 100$r$)
(2) Descend at 200'/minute ($a$±200'=200$t_s$)
(3) Descend at 500'/minute ($a$±200'=200$t_s$ to 500$t_s$)
(4) Descend at 500'/minute "emergency" ($a$±200'= 500$t_s$ to 1000$t_s$)
(5) "Failure" ($a$±200'=1000$t_s$ to 1500$t_s$)

The above, with the exception of the instruction bank on 100$r$, is accomplished by linear potentiometer P$_{17}$, driven at constant speed from shaft 46, altitude signal commutator 49 mounted on shaft 46, and Coincidence Circuit No. 2. The operation of these elements is illustrated more clearly in Fig. 23. Linear potentiometer P$_{17}$ has a D. C. voltage applied across it that is always equal to 1500$t_s$. This voltage is obtained from the altitude contact 39 of switch K$_{13}$ in the Schedule Computer, Fig. 17. Therefore, the voltage at the wiper of this potentiometer, which is driven at constant speed from shaft 46, varies from zero to a value equal to 1500$t_s$ feet. The wiper voltage is applied along with a voltage "$a$," representing the altitude of the aircraft and obtained from the tracking unit of the radar set, to Coincidence Circuit No. 2. When the two voltages are equal a pulse is applied to the Altitude Signal Commutator 49. The construction of this coder is shown in Fig. 23 and operates to channel the pulse applied into one of five circuits depending upon the altitude of the airplane expressed as a multiple of $t_s$. Since a pulse is applied to any of these circuits only once during each revolution of $P_{17}$ a suitable storage device is required to obtain a steady output therefrom. The steady outputs from the storage device may be used to actuate relays in the signalling circuits of the transmitter.

The instruction to ascend at 500'/min. when $a$ is less than $100r$ is accomplished by closure of the circuit between terminals 31 of the First Sequence Unit, Fig. 6, this function being performed by the Unit during both First and Second Sequences.

Velocity instructions are transmitted to the airplane during the Second Sequence when $R<0.98$. This information is also sent as a rate-of-change instruction. The process is similar to that employed for altitude information. A voltage $v_0$ representing the required aircraft velocity, derived from the Schedule Correction Computer (Fig. 18), and a voltage $v$ representing the actual velocity of the aircraft, supplied by the radar tracking unit, are applied to subtracting circuit 50 and the difference $v_0-v$ obtained. The potentiometer $P_{18}$ and the Velocity Signal Commutator are shown in more detail in Fig. 4. $P_{18}$ is center-tapped and a voltage $E_{14}$, of the same character as the voltages $v_0$ and $v$, is applied thereacross. The magnitude of $E_{14}$ should be such as to represent on $P_{18}$, in either polarity, the maximum possible difference between $v_0$ and $v$. This maximum difference has been assumed to be 100 M. P. H. in the example shown. As in the case of the Altitude Signal Commutator, the Velocity Signal Commutator channels the coincidence pulse into the appropriate one of five circuits representing the five velocity instructions. Storage System No. 3 is used to produce a steady output from these circuits. These outputs may be utilized to close relays, for example, in the proper signalling circuits of the transmitter.

The "Failure" signal required when, with $r$ less than $2+$, R is greater than 1.2 or less than 0.8, and whenever R is less than 0.7, is indicated by closure of contacts $K_{18a}$ of the Schedule Correction Computer (Fig. 18). Since the signal is in a form which can be utilized by the transmitter, namely the closing of a circuit, no processing thereof by the Signal Selector Unit is required. Similarly, "Orbit" instructions due to R exceeding $2+$ are in the form of closure of a circuit ($SW_{10}$ of Fig. 18) and therefore this signal also needs no processing by the Signal Selector Unit.

At the successful completion of the Second Sequence instructions to "Prepare for Final Approach" and later to "Transfer to Final Aid" are sent to the aircraft. These may be accomplished by a suitable switch on the $r$ shaft, such as $SW_{11}$, one circuit of which closes at a range of about 3 miles and the other at from 1 to 2 miles. Contacts $d$ of $K_{18}$ are common to these circuits and prevent transmission of the signals in event of "Failure" ($K_{18}$ energized). Since these signals are in the form of closure of a circuit, further processing thereof by the Signal Selector Unit is not required.

For automatic pilot operation it is desirable to transmit course information in the form of a rate-of-change instruction rather than to transmit the actual course as described above. This may be accomplished by replacing the Course Coding Commutator with a potentiometer $P_{19}$ having a wiper driven by shaft 46, as shown in Fig. 25. The output pulse of Coincidence Circuit No. 1 is applied across the potentiometer and the resulting pulse at the wiper, the amplitude of which with respect to that of the coincidence pulse is determined by the angular position of the wiper at the time of coincidence, is applied to a storage circuit for conversion into a steady voltage. In this case the coincidence pulse must have a constant amplitude of such value that the storage circuit output voltage equals $\phi_0$. This voltage is applied to a subtraction circuit along with the actual course $\phi$ obtained from the radar tracking unit and the difference voltage $\phi_0-\phi$ obtained. The difference voltage is then applied to a circuit similar to the velocity circuit shown in Fig. 20d to generate five rate-of-change course instructions depending upon the difference between $\phi_0$ and $\phi$. These instructions are:

(1) $(\phi_0-\phi)>+15°$—Right at 3° per second
(2) $+15°>(\phi_0-\phi)>+3°$—Right at 1½° per second
(3) $(\phi_0-\phi)<\pm3°$—No change
(4) $-15°>(\phi_0-\phi)>-3°$—Left at 1½° per second
(5) $(\phi_0-\phi)>-15°$—Left at 3° per second

*Parameters and constants*

In the above described DATAC system the following parameters and constants are used.

(1) Range $(r)=0$ to 50 miles
(2) Azimuth $(\theta)=0$ to 360 degrees
(3) Altitude $(a)=0$ to 24,000 feet
(4) Cruising air speeds $(v')=90$ to 450 M. P. H.
(5) Minimum separation time=1½ minutes
(6) Number of values of $t_s$ (steps of $K_{13}$)=20
(7) Maximum values of $t_s$=30 minutes The scales used were as follows:

(1) Range: 2.2 volts A. C. corresponds to 1 mile
(2) Azimuth: 0.1 volt D. C. corresponds to 1 degree
(3) Altitude: 1.0 volt D. C. corresponds to 1,000 feet A. C. voltage is used for representing range to simplify the design of Servo No. 2, which is the only equipment to which range data is fed. The cruising air speeds, $v'$, are set in on the Variac in Fig. 10, thereby varying the voltage equivalent to a given range and effectively dividing distance-to-go by velocity. The lowest speed, 90 M. P. H., corresponds to the highest Variac setting—110 volts, while 450 M. P. H. is set in as 22 volts. A 90 M. P. H. aircraft with 50 miles to travel accordingly has a $t_d$=110 volts, which must also equal 33.3 minutes. One minute of time therefore equals 3.30 volts. On this basis, the minimum separation time of 1½ minutes equals 5 volts and the total turn scale equals 99 volts.

The regulated voltages employed are listed below:

| Voltage | Physical Interpretation | Limits | Max Voltage | Figure of Drawings |
|---|---|---|---|---|
| $E_1$ | $(90°-\theta)$ or $180°$ | 0–180° | 18 v. D. C. | Fig. 6. |
| $E_2$ | A min | 0–5000' | 5 v. D. C. | Fig. 6. |
| $E_3$ | A max | 1,200'–11,200' | 11.2 v. D. C. | Fig. 6. |
| $E_4$ | | | 24 v. D. C. | Fig. 10. |
| $E_5$ | Max. δ signal | ±312.5° | 31.25 v. D. C. | Fig. 10. |
| $E_6$ | | | 115 v. A. C. | Fig. 10. |
| $E_7$ | $r$ | 50 mi | 110 v. A. C. | Fig. 10. |
| $E_8$ | Max. Δ$r$ sig | 21.13 mi | 46.5 v. A. C. | Fig. 10. |
| $E_9$ | $t_s$ | 0–30 min | 99 v. A. C. | Figs. 17 and 17a. |
| $E_{10}$ | 1500 $t_s$ | 0–45,000' | 45 v. D. C. | Figs. 17 and 17a. |
| $E_{11}$ | β | ±90° | ±9 v. D. C. | Fig. 18. |
| $E_{12}$ | $v'$ | 90–450 M. P. H. | (*) | Fig. 18. |
| $E_{13}$ | ±δ±β | ±180° | +and −18 v. D. C. | Fig. 20. |
| $E_{14}$ | $(v_0-v)$ max | ±100 M. P. H. | (*) | Fig. 24. |
| $E_{15}$ | | | (*) | Fig. 25. |

* Depends upon corresponding output of radar tracking unit.

I claim:

1. In an air traffic control system for governing the flight of aircraft desiring to land on a given runway in which means are provided for continuously determining for each controlled aircraft the azimuth ($\theta$) of the aircraft from a predetermined turn-on point on the extended axis of said runway, the range from said turn-on point and the altitude, and in which means are provided for transmitting flight instruction to said aircraft, computing means for converting said azimuth, range and altitude data into said flight instructions, said computing means comprising: means for determining from the azimuth, range and altitude of each aircraft brought under control proper flight instructions for placing the aircraft inside a predefined volume consisting of all suitable approach start points; means operative when a controlled aircraft is in said volume for continuously computing from the range and azimuth of the aircraft the angle ($\pm\delta$) between the bearing from the aircraft to the turn-on point and the direct flight pattern to the turn-on point, said direct pattern being a straight line tangentially joining a final turn arc of preestablished radius; means for determining for each aircraft the direct pattern flight time ($t_d$) based on a constant aircraft speed; scheduling means for establishing a plurality of discrete times-of-arrival at said turn-on point and for continuously indicating the time-to-go ($t_s$) until each time of arrival; means operative when a controlled aircraft is in said volume for selecting therefor the shortest available $t_s$ greater than $t_d$; means for deriving for each controlled aircraft an offset angle ($\pm\beta$) proportional to the ratio $t_s/t_d$; means for adding ($\theta+180°$) to ($\pm\delta\pm\beta$) for each controlled aircraft to produce the desired instantaneous course for each aircraft; and means for comparing the actual altitude of each controlled aircraft with an altitude equal to a predetermined multiple of the $t_s$ for the aircraft and for issuing altitude flight instructions designed to maintain equality between said altitudes.

2. Apparatus as claimed in claim 1 in which the said means for placing the aircraft inside said predefined volume contains means operative during the entire control period for comparing the actual altitude of a controlled aircraft with a minimum altitude equal to a predetermined fixed multiple of the range of the aircraft and for issuing altitude flight instructions designed to keep said aircraft above said minimum altitude.

3. Apparatus as claimed in claim 2 in which there are provided means responsive to the ratio $R=t_s/t_d$ for instructing a controlled aircraft to fly at a speed $$v_0 = \frac{v'}{R^2}$$

where $v'$ is the cruising speed of said aircraft, when R is less than unity.

4. Apparatus as claimed in claim 3 in which means responsive to R are provided for instructing a controlled aircraft to orbit and to prevent the addition of ($\theta+180°$) to ($\pm\delta\pm\beta$) when R is greater than 2.

5. Apparatus as claimed in claim 4 in which means are provided means responsive to the ratio $R=t_t/t_d$ for in- issuing flight instructions to the controlled aircraft for placing it in said aforementioned volume for starting a new approach when, with the range less than a predetermined minimum value, R is greater than approximately 1.2 and less than approximately 0.8, and at all ranges when R is less than 0.7.

6. Apparatus as claimed in claim 5 in which means, operative at predetermined low values of range, are provided to signal instructions to prepare for final approach and to switch to landing aid, and in which means are provided to prevent the signalling of said instructions if said "Failure" signalling means has operated.

7. In an air traffic control system for governing the flight of aircraft desiring to land on a given runway in which means are provided for continuously determining for each controlled aircraft the azimuth ($\theta$) of the aircraft from a predetermined turn-on point on the extended axis of said runway, the range from said turn-on point and the altitude, and in which means are provided for transmitting flight instruction to said aircraft, computing means for converting said azimuth, range and altitude data into said flight instructions, said computing means comprising: unit computers individually assignable to each aircraft; means in each unit computer for determining from azimuth and altitude data for the controlled aircraft proper flight instructions for placing the aircraft inside a predefined volume consisting of all suitable approach start points; means in each unit computer, beginning operation when the controlled aircraft is in said volume, for continuously computing from the range and azimuth of the aircraft the angle ($\pm\delta$) between the bearing from the aircraft to the turn-on point and the direct flight pattern to the turn-on point, said direct pattern being a straight line tangentially joining a preestablished final turn path; means in each unit computer for determining the direct pattern flight time ($t_d$) based on a constant aircraft speed; scheduling means common to said unit computers for establishing a plurality of discrete times-of-arrival at said turn-on point and for continuously indicating the time-to-go ($t_s$) until each time-of-arrival; means in each unit computer cooperating with said scheduling means for selecting for its controlled aircraft the shortest available $t_s$ greater than $t_d$; means in each unit computer for deriving a course correction angle ($\pm\beta$) proportional to the ratio $t_s/t_d$; means in each unit computer to add ($\theta+180°$) to ($\pm\delta\pm\beta$) to produce the desired instantaneous course of the controlled aircraft; means common to said unit computers for computing, for each of said times-of-arrival, an altitude equal to a predetermined fixed multiple of $t_s$; means in each unit computer cooperating with said common altitude computing means for deriving from said fixed multiple of $t_s$ a predetermined lower multiple of $t_s$ representing a desired altitude; and means in each unit computer for comparing the actual altitude of the controlled aircraft with said lower multiple of $t_s$ and for issuing altitude flight instructions designed to effect equality therebetween.

8. Apparatus as claimed in claim 7 in which the said means in each unit computer for placing the aircraft inside said predefined volume contains means operative during the entire control period for comparing the actual altitude of said aircraft with a minimum altitude equal to a predetermined fixed multiple of the range of the aircraft and for issuing altitude flight instructions designed to keep said aircraft above said minimum altitude.

9. Apparatus as claimed in claim 8 in which each unit computer contains means responsive to the ratio $R=t_s/t_d$ for instructing a controlled aircraft to fly at a speed $v_0=v'/R^2$, where $v'$ is the cruising speed of the aircraft, when R is less than unity in which each unit computer contains means responsive to R for instructing a controlled aircraft to orbit and to prevent the addition of ($\theta+180°$) to ($\pm\delta\pm\beta$) when R is greater than 2; in which each unit computer contains means for signalling an approach "Failure" and for issuing flight instructions to a controlled aircraft for placing it in said aforementioned volume for starting a new approach when, with the range of said aircraft less than a predetermined minimum value, R is greater than approximately 1.2 or less than approximately 0.8 and at all ranges when R is less than approximately 0.7; and in which each unit computer contains means operative in the presence of said "Failure" signal to prevent the transmission of the $v_0$ velocity instruction and to prevent the addition ($\theta+180°$) to ($\pm\delta\pm\beta$).

10. In an air traffic control system for governing the flight of aircraft desiring to land on a given runway having a preestablished turn-on point in the extended axis thereof, and in which means are provided for determining the altitude of each aircraft and its range ($r$) and azimuth ($\theta$) from said turn-on point, said runway being at zero azimuth, a computer for supplying course and altitude instructions to an aircraft brought under control while in a volume consisting of all points unsuitable for the start of an approach to said turn-on point, said instruction being designed to remove said aircraft from said volume, said volume being defined by all points above a circular area of predetermined radius ($r_0$) centered on said turn-on point, all points above a strip coaxial with and including said runway, having a width equal to the diameter of said circular area and extending from the boundary of said circular area to an arc having a radius from the turn-on point equal to the maximum range of the control system, all points at an altitude less than a lower limit equal to a predetermined lower multiple of the range, and all points above an upper limit equal to the predetermined desired altitude at said turn-on point plus a predetermined higher multiple of the range, said computer comprising: means for applying the said altitude, range and azimuth of an aircraft as inputs thereto; means actuated by said range input for producing an instruction to fly a course equal to $\beta$ when $r$ is less than $r_0$; means actuated by said azimuth and range input for producing an instruction to fly a course of 270° when $r$ is equal to or greater than $r_0$ and $\theta$ or $(360°-\theta)$ is less than $$\sin^{-1}\frac{r_0}{r}$$

means actuated by altitude and range inputs for comparing altitude input with a lower limit of altitude as a function of range and for producing an instruction to ascend when below said lower limit, said means also comparing said altitude input with an upper limit of altitude as a function of range and producing an instruction to climb when said input is above said upper limit.

11. In an air traffic control system for governing the flight of aircraft desiring to land on a given runway having a preestablished turn-on point in the extended axis thereof, and in which means are provided for determining the altitude of each aircraft and its range ($r$) and azimuth ($\theta$) from said turn-on point, said runway being at zero azimuth, a computer for supplying course and altitude instructions to an aircraft brought under control while in a volume consisting of all points unsuitable for the start of an approach to said turn-on point, said instruction being designed to remove said aircraft from said volume, said volume being defined by all points above a circular area of predetermined radius ($r_0$) centered on said turn-on point, all points above a strip coaxial with and including said runway, having a width equal to the diameter of said circular area and extending from the boundary of said circular area to an arc having a radius from the turn-on point equal to the maximum range of the control system, all points at an altitude less than a lower limit equal to a predetermined lower multiple of the range, and all points above an upper limit equal to the predetermined desired altitude at said turn-on point plus a predetermined higher multiple of the range, said computer comprising: means for applying the said altitude, range and azimuth of an aircraft as inputs thereto; means actuated by said range input for closing a first electrical circuit when the range is less than the radius of said circular area; means activated by said azimuth and range inputs for closing a second electrical circuit whenever the range ($r$) is equal to or greater than $r_0$ and the azimuth ($\theta$) or $(360°-\theta)$ is less than $$\sin^{-1}\frac{r_0}{r}$$

means responsive to closure of said first electrical circuit for producing an instruction for the aircraft to fly a course equal to $\theta$; means responsive to closure of said second circuit for producing an instruction for the aircraft to fly a course of 270°; means actuated by said altitude limits and said altitude input for closing a third electrical circuit when said input altitude is less than said lower limit to instruct said aircraft to ascend, and for closing a fourth electrical circuit when said input altitude is greater than said upper limit to instruct said aircraft to descend; and means acting simultaneously with the closure of any of said four electrical circuits to close a fifth electrical circuit to indicate that said aircraft is in said unsuitable volume.

12. Apparatus as claimed in claim 11 in which said means actuated by said azimuth ($\theta$) and range ($r$) inputs for closing a second electrical circuit comprises first and second electrical contacts, said first contact being in the form of a cylindrical surface having a length proportional to $r-r_0$ and extending on either side of a longitudinal axis of symmetry a distance proportional to $$\sin^{-1}\frac{r_0}{r}$$

said second contact being in the form of a helix positioned to touch said first contact along a line parallel to said axis of symmetry, means for rotating said first contact about its cylindrical axis through an angle proportional to $\beta$, and means for rotating said helix about its axis through an angle proportional to $r$.

13. In an air traffic control system, a computer for continuously determining the instantaneous course to be flown by an aircraft traveling at constant speed from a remote point to the turn-on point on the extended axis of a runway, so that the aircraft will traverse an indirect flight pattern between said points that will consume a predetermined interval of time ($t_s$), said interval exceeding that interval ($t_d$), which would be consumed by following a direct flight pattern merging tangentially near the end with a final-turn arc of predetermined radius, said computer comprising: means for applying as input data to said computer the azimuth ($\theta$) of said aircraft from said turn-on point, said runway being at zero azimuth, the range of said aircraft measured from said turn-on point, and the speed of said aircraft; means for continuously computing from the range and azimuth of said aircraft the angle ($\pm\delta$) between the bearing from the aircraft to said turn-on point and the direct flight pattern to the turn-on point; means for continuously determining from the range, azimuth and speed of said aircraft the direct pattern flight time ($t_d$); means for continuously deriving an offset angle ($\pm\beta$) proportional to the ratio $t_s/t_d$; and means for continuously adding $\pm\delta$ and $\pm\beta$ to ($\beta+180°$) to derive the desired instantaneous course to be flown by said aircraft.

14. Apparatus as claimed in claim 13 in which means are provided for determining the signs of both $\delta$ and $\beta$ as functions of the aircraft azimuth ($\theta$).

15. In an air traffic control system for governing the flight of aircraft desiring to land on a given runway having a turn-on point on the extended axis thereof, and in which means are provided for computing the direct pattern flight time ($t_d$) of an aircraft to said turn-on point, said direct pattern being a straight line tangentially joining a final turn arc of preestablished radius, a computer for scheduling the arrival of aircraft at said turn-on point, said computer comprising: clock driven means for producing a plurality of similar sawtooth voltages each corresponding to a predetermined time-of-arrival at said turn-on point, said voltages decreasing linearly with time and having a phase difference between adjacent voltages equal to the desired time difference between adjacent times-of arrival at said turn-on point, the time at which each sawtooth voltage reaches zero being a scheduled time-of-arrival at said turn-on point and the instantaneous value of each saw-tooth voltage being proportional to the time-to-go ($t_s$) until its associated time-of-arrival; a plurality of continuously rotatable stepping switches each having a bank of stationary $t_s$ contacts, equal in number to and corresponding to said sawtooth voltages, and a stepping $t_s$ contact cooperating therewith; an equal number of continuity current circuits connected in parallel to a voltage source and passing through each of said stepping switches, each of said circuits corresponding to the same stationary $t_s$ contact in each switch; a stepping continuity current sampling contact in each switch operating in phase with the stepping $t_s$ contact and introducing a continuity current sampling circuit into the continuity current circuit corresponding to the stationary $t_s$ contact on which the stepping $t_s$ contact is resting; means for applying each sawtooth voltage to its corresponding stationary $t_s$ contact in each stepping switch; a control circuit associated with each stepping switch; means in each control circuit for comparing the direct pattern flight time ($t_d$) of a controlled aircraft with the time to-go ($t_s$) represented by the stationary $t_s$ contact on which the stepping $t_s$ contact is resting and for advancing said stepping $t_s$ contact to the stationary $t_s$ contact having the lowest value of $t_s$ greater than $t_d$ for which there is a continuity current as indicated by said continuity current sampling circuit; and means in each of said control circuits, operative when said control circuit and associated stepping switch are not acting to select a $t_s$ for keeping said stepping $t_s$ contact on the stationary $t_s$ contact representing the lowest value of $t_s$.

16. In an air traffic control system, first means for continuously determining the range and azimuth of an aircraft with respect to a specified point, second means connected to and receiving range and azimuth data from said first means and having provision for the insertion of a quantity representing the cruising speed of said aircraft for continuously computing from these data the course ($\phi_d$) and the flight time ($t_d$) between the instantaneous position of said aircraft and said point over a direct flight pattern consisting of a straight path tangent to a turn circle including said point, third means connected to said second means and receiving $t_d$ therefrom for establishing a time of arrival at said point having a time-to-go ($t_s$) greater than $t_d$, and fourth means connected to said second means and receiving $\phi_d$ and $t_d$ therefrom and connected to said third means and receiving $t_s$ therefrom and operating when $t_s$ is greater than $t_d$ to compute instantaneous flight directions for said aircraft that differ from $\phi_d$ as a function of the excess of $t_s$ over $t_d$ and which define over a period of time an indirect flight path that eventually brings $t_s$ into equality with $t_d$, and means for transmitting said instantaneous flight directions to said aircraft.

17. Apparatus as claimed in claim 16 in which said fourth means is also responsive to a value of $t_s$ slightly less than $t_d$ to compute a new aircraft speed exceeding said aircraft cruising speed by an amount sufficient to bring $t_d$ into equality with $t_s$.

18. In an air traffic control system, first means for continuously determining the position of an aircraft with respect to a specified point, second means connected to said first means and receiving positional data therefrom for establishing from said data and the cruising speed of said aircraft a time of arrival at said point for which the initial time-to-go is greater than the direct flight time at said cruising speed to said point and for also continuously computing the remaining time-to-go to said time of arrival, third means connected to said first and second means and receiving positional data and said remaining time-to-go therefrom, respectively, for determining a flight path to said point of such length that the time required to travel said path at said cruising speed equals said initial time-to-go, and means for transmitting flight instructions to said aircraft for controlling its flight along said path.

References Cited in the file of this patent
UNITED STATES PATENTS

| | | |
|---|---|---|
| 2,582,588 | Fennessy | Jan. 15, 1952 |
| 2,646,924 | Schuck | July 28, 1953 |